United States Patent
Ikeda et al.

(10) Patent No.: US 6,811,184 B2
(45) Date of Patent: Nov. 2, 2004

(54) HEAD PROTECTING AIRBAG DEVICE

(75) Inventors: Takanobu Ikeda, Aichi-ken (JP); Takashi Yamamoto, Aichi-ken (JP); Michio Inoue, Aichi-ken (JP); Tetsuya Ogata, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 95 days.

(21) Appl. No.: 10/291,499

(22) Filed: Nov. 12, 2002

(65) Prior Publication Data

US 2003/0090093 A1 May 15, 2003

(30) Foreign Application Priority Data

Nov. 12, 2001 (JP) ........................................ 2001-346676

(51) Int. Cl.[7] .............................................. B60R 21/26
(52) U.S. Cl. ..................................... 280/742; 280/730.2
(58) Field of Search .............................. 280/730.2, 736, 280/742, 743.1, 729

(56) References Cited

U.S. PATENT DOCUMENTS

| 5,788,270 | A | * | 8/1998 | Haland et al. ............... 280/729 |
| 6,199,898 | B1 | * | 3/2001 | Masuda et al. ........... 280/730.2 |
| 6,293,581 | B1 | * | 9/2001 | Saita et al. ............... 280/730.2 |
| 6,334,625 | B1 | * | 1/2002 | Pausch et al. ............... 280/729 |
| 6,601,871 | B2 | * | 8/2003 | Fischer ..................... 280/730.2 |
| 2002/0014763 | A1 | * | 2/2002 | Nakanishi et al. ........... 280/740 |

FOREIGN PATENT DOCUMENTS

JP     A-2000-296753     10/2000

* cited by examiner

*Primary Examiner*—David R. Dunn
(74) *Attorney, Agent, or Firm*—Posz & Bethards, PLC

(57) ABSTRACT

A head protecting airbag device comprises an airbag folded and housed above the upper edge of a window on the interior side. The airbag includes an airbag body and a current regulating cloth. The airbag body includes: an inflation shielding portion; a gas feed passage portion arranged in the longitudinal direction of the vehicle above the upper edge of the inflation shielding portion; and one gas inlet port protruded upward from a portion of the gas feed passage portion removed from the front end and the rear end. The current regulating cloth includes an inlet side portion and an outlet side portion. The outlet side portion includes first and second gas outlet holes capable of releasing the inflating gas from the inflator to the front and the rear along the gas feed passage portion.

11 Claims, 24 Drawing Sheets

HEAD PROTECTING AIRBAG DEVICE

This application claims priority from Japanese patent application of Ikeda et al, filed Nov. 12, 2001, No.2001-346676, the complete disclosure of which is hereby incorporated into the present application by this reference.

BACKGROUND OF THE INVENTION

1. Field of the Invention

The present invention relates to a head protecting airbag device including an airbag, which is folded and housed above the upper edge of a window in the interior of a vehicle so that it may be expanded downward to cover the interior side of the window when the airbag admits an inflating gas.

2. Description of the Related Art

Usually, the head protecting airbag device of this kind is desired to expand quickly at a necessary time for protecting a passenger properly with the expanded airbag. Therefore, a head protecting airbag device constructed to expand the airbag quickly is disclosed in Unexamined Published Japanese Patent Application No. 2000-296753.

In this head protecting airbag device, two gas inlet ports are arranged at the upper edge near the middle position in the longitudinal direction of the airbag so as to confront each other in the longitudinal direction. In the construction, moreover, the front and rear ends of an inflator are individually connected to those two gas inlet ports. In other words, the inflating gas, as discharged from the two ends of the inflator, is introduced through two gas inlet ports of the airbag in two directions, i.e., to the front side and to the rear side in the longitudinal direction of the vehicle into the airbag.

However, the head protecting airbag device of the prior art is constructed such that the inflating gas discharged from the two ends of one inflator is guided into the airbag through the two gas inlet ports arranged in the airbag. This makes it necessary to connect the two ends of the inflator and the two gas inlet ports while considering the sealing properties. As a result, the connecting works is complicated to increase the number of steps of and raise the cost for the manufacture.

SUMMARY OF THE INVENTION

The present invention has an object to provide a head protecting airbag device which can reduce the number of steps of and lower the cost for the manufacture while retaining the quick completion of expansion of the airbag.

This object of the invention can be achieved by a head protecting airbag device having the following construction:

A head protecting airbag device comprising:
an airbag folded and housed above the upper edge of a window on the interior side of a vehicle and adapted to be inflated downward, when the airbag admits an inflating gas, to cover the interior side of the window,
wherein the airbag includes an airbag body and a flexible current regulating cloth,
wherein the airbag body includes: an inflation shielding portion for shielding the interior side of the window; a gas feed passage portion for guiding the inflating gas discharged from an inflator into the inflation shielding portion; and one gas inlet port constructed to be connected to the inflator,
wherein the inflation shielding portion is inflated to separate an interior side wall portion from an exterior side wall portion by admitting the inflating gas,
wherein the gas feed passage portion is arranged above the upper edge of the inflation shielding portion and in the longitudinal direction of the vehicle,
wherein the gas inlet port is arranged to communicate with the portions in the gas feed passage portion excepting the vicinity of the front end and the vicinity of the rear end and to protrude upward from the gas feed passage portion,
wherein the current regulating cloth includes an inlet side portion arranged in the gas inlet port and connectable with the inflator, and an outlet side portion arranged near the gas inlet port of the gas feed passage portion, and
wherein the outlet side portion includes a first gas outlet hole and a second gas outlet hole capable of releasing the inflating gas discharged from the inflator to the front side and the rear side along the gas feed passage portion.

In the head protecting airbag device of the aforementioned construction, the inflator is connected to one gas inlet port formed in the airbag body. And, the inflating gas discharged from the inflator is guided into the airbag body in the two longitudinal directions, i.e., toward the front and rear of the vehicle, by the current regulating cloth arranged near the gas inlet port. Unlike the prior art, therefore, it is unnecessary to arrange two gas inlet ports in the airbag. Specifically, it is sufficient to arrange one gas inlet port in the airbag and to connect that one gas inlet port to the inflator. This makes it possible to reduce the number of steps of and lower the cost for manufacturing the airbag device.

In the head protecting airbag device of the aforementioned construction, moreover, the gas feed passage portion is arranged in the longitudinal direction of the vehicle. And, the current regulating cloth is provided with the first and second gas outlet holes capable of releasing the inflating gas forward and rearward along the gas feed passage portion. Therefore, the inflating gas released from the first and second gas outlet holes of the current regulating cloth flows into the airbag body forward and rearward of the airbag body along the gas feed passage portion. Specifically, the inflating gas quickly flows to the two longitudinal end sides of the inflation shielding portion arranged on the lower side of the gas feed passage portion. And, whole of the inflation shielding portion can be expanded quickly. As a result, the airbag body can quickly complete its inflation and cover the interior sides of the windows.

Therefore, the head protecting airbag device of the aforementioned construction can reduce the number of construction steps and lower the cost of manufacture by retaining the quick expansion and inflation of the airbag.

In the head protecting airbag device of the aforementioned construction, further, the inflating gas released from the outlet side portion of the current regulating cloth can be guided into the airbag body forward and rearward of the airbag body along the gas feed passage portion. Therefore, the outlet side portion of the current regulating cloth need not be arranged substantially all over the gas feed passage portion in the airbag body, but it is sufficient to arrange the outlet side portion of the current regulating cloth in the gas feed passage portion near the gas inlet port. As a result, the current regulating cloth can be made compact and minimize the volume of the upper side portion at the time when the airbag is folded.

In the head protecting airbag device of the aforementioned construction, moreover, the inflating gas can be branched and released out forward and rearward along the gas feed passage portion by the current regulating cloth itself. In other words, the construction does not mainly change the flow of the inflating gas by the airbag body itself so that the damage to the airbag body by the inflating gas can be suppressed.

Moreover, the head protecting airbag device of the aforementioned construction preferably has a construction,
wherein the outlet side portion is formed into a generally cylindrical shape having its two front and rear ends opened to form the first and second gas outlet holes, and
wherein the outlet side portion is made to have an external diameter size smaller than the internal diameter size of the gas feed passage portion in the airbag body.

With this construction, at the initial stage of inflation of the airbag body, the current regulating cloth is not inflated in such a way that it expands the gas feed passage portion, even if the current regulating cloth is inflated by the inflating gas admitted, so that the damage to the airbag body can be suppressed. This is because the external diameter size of the outlet side portion in the current regulating cloth is made smaller than the internal diameter size of the gas feed passage portion.

Moreover, the head protecting airbag device of the aforementioned construction preferably has a construction, wherein the outlet side portion further includes a third gas outlet hole formed in the lower side between the first gas outlet hole and the second gas outlet hole for injecting the inflating gas downward.

With this construction, the inflating gas discharged from the inflator can be released downward from the third outlet hole formed in the current regulating cloth, into the airbag body. In accordance with the downward inflow of the inflating gas, therefore, the vicinity of the gas inlet port of the airbag body can be quickly inflated downward so that the airbag body can complete its inflation more quickly.

Still moreover, the head protecting airbag device of the aforementioned construction preferably has a construction wherein joint portions are arranged near the lower edges of the first and second gas outlet holes of the current regulating cloth in the airbag body, extend in the longitudinal direction, and are joined to the interior side wall portion and the exterior side wall portion so as to form the lower edge side of the gas feed passage portion.

With this construction, at the initial stage of inflation of the airbag body, the lower edge sides of the first and second gas outlet holes can be supported by the horizontal joint portions when the current regulating cloth admits the inflating gas and releases it from the first and second gas outlet holes into the airbag body. Therefore, it is possible to suppress the downward deviation of the portions of the current regulating cloth near the first and second gas outlet holes when the inflating gas flows out. As a result, it is possible to stabilize the outflow direction of the inflating gas into the airbag body.

Still moreover, the head protecting airbag device of the aforementioned construction preferably has a construction,
wherein the opening faces of the first and second gas outlet holes in the outlet side portion tilt diagonally from the vertical direction when the inflating gas flows out, and
wherein the inflating gas spurting from the first and second gas outlet holes are released in two directions, i.e., downward slanting to the front and to the rear in the longitudinal direction of the airbag body.

With this construction, the inflating gas discharged from the inflator is released from the first and second gas outlet holes of the current regulating cloth in the two directions, i.e., obliquely downward to the front side and to the rear side in the longitudinal direction of the airbag body. Therefore, the flow of the inflating gas to the front side and the rear side in the vehicular longitudinal direction can be retained, even if the outlet side portion of the current regulating cloth is not arranged to go far into the gas feed passage portion. As a result, the current regulating cloth can be made more compact. With this construction of the current regulating cloth, moreover, when the airbag body is folded, the volume of the portion near the gas inlet port can be reduced to allow the airbag to be folded compactly.

Still further, the head protecting airbag device of the aforementioned construction preferably has a construction,
wherein the inflator includes a generally column-shaped body portion, and a generally cylindrical diffuser capable of being mounted on the body portion,
wherein the body portion includes gas discharge ports capable of discharging the inflating gas,
wherein the diffuser is provided in its circumference with an injection port for injecting the inflating gas discharged from the gas discharge ports, and has high shape hold ability than the current regulating cloth,
wherein the diffuser is so assembled together with the body portion as to inject the inflating gas from the injection port, discharged from the gas discharge ports,
wherein the inflator is so inserted, when assembled with the airbag, into the inlet side portion in the current regulating cloth as to support the current regulating cloth, and
wherein the injection port is arranged to inject the inflating gas out of the outlet side portion slanting downward.

With this construction, the inflating gas discharged from the body portion of the inflator can be injected by the diffuser to the side of the outlet side portion of the current regulating cloth. This makes it possible to suppress the damage to the current regulating cloth when the airbag is expanded and inflated. Because, the diffuser has higher shape holdability, in other words, more rigid than the current regulating cloth. Moreover, the inlet side portion in the current regulating cloth can be supported by the inflator. This construction makes it easy to fix the current regulating cloth.

Still moreover, the head protecting airbag device of the aforementioned construction preferably has a construction, wherein the diffuser is provided with two injection ports capable of injecting the inflating gas in two directions, i.e., obliquely downward to the front side and to the rear side in the longitudinal direction of the airbag body on the side of the outlet side portion.

With this construction, the inflating gas, as discharged from the body portion of the inflator, can be injected in the two directions, i.e., obliquely downward to the front side and to the rear side in the longitudinal direction of the airbag body by the diffuser. Therefore, the branching of the inflating gas to both sides in the longitudinal direction of the vehicle need not be made exclusively by the current regulating cloth. As a result, in the head protecting airbag device of the aforementioned construction, the current regulating cloth can be easily manufactured without setting the strength of the current regulating cloth strictly.

Still moreover, the head protecting airbag device of the aforementioned construction preferably has a construction, wherein the gas feed passage portion is arranged substantially all over the entire length, in the longitudinal direction, of the airbag body.

With this construction, the inflating gas which has flowed into the gas feed passage portion can arrive more quickly at the front end side and the rear end side of the airbag body. Therefore, the inflation shielding portion in the airbag body can be inflated more quickly in its entirety.

DESCRIPTION OF THE PREFERRED EMBODIMENTS

Figure 1:
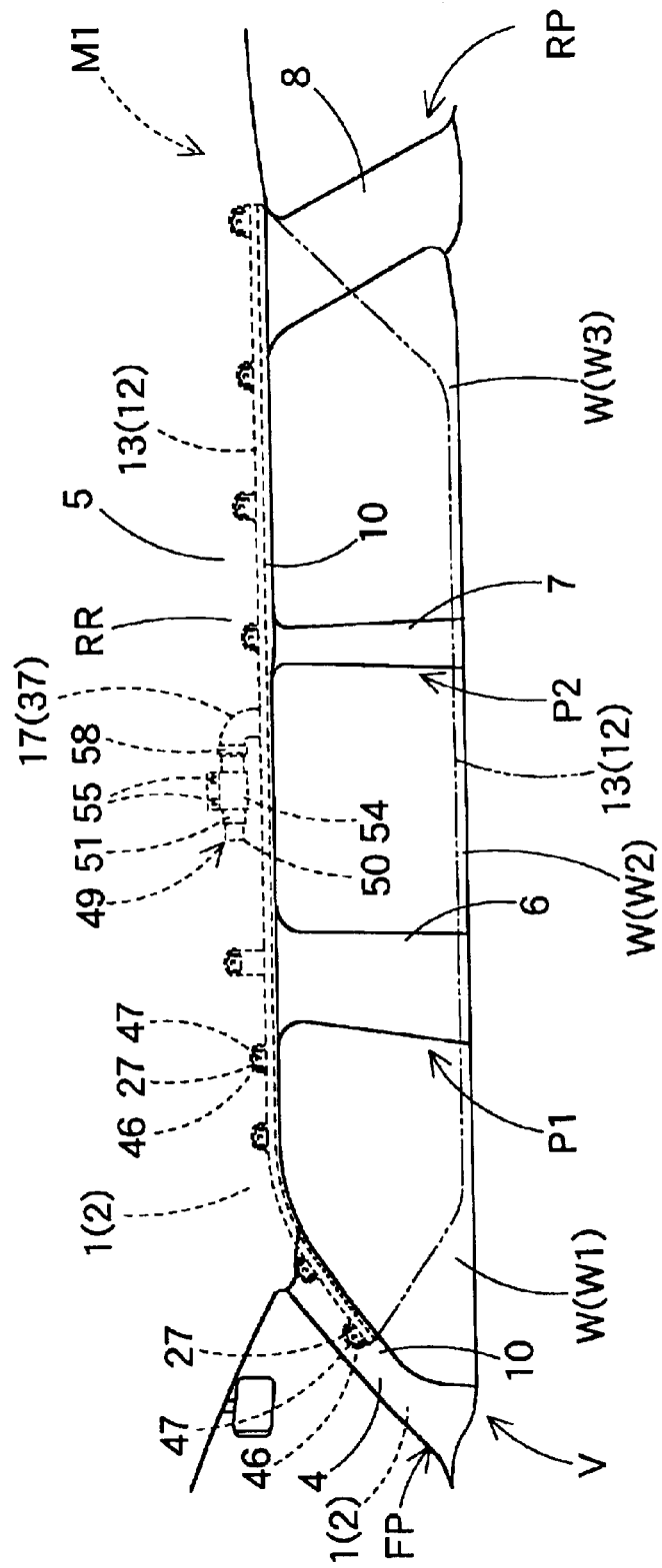
FIG. 1 is a schematic front elevation showing the used state of a head protecting airbag device according to a first embodiment of the invention and taken from the inside of a vehicle.

The invention will be described below by way of embodiments shown in the drawings. In addition, the invention is not limited to the embodiments. All modifications within the requirements of the claims and equivalents with respect to the requirements should be included in the scope of the claims.

One embodiment of the present invention will be described with reference to the accompanying drawings.

In a head protecting airbag device (as will be abbreviated into the "airbag device") M1 according to a first embodiment of the invention, as shown in FIG. 1, an airbag 12 is folded and housed at the lower edge side of a front pillar portion FP, the lower edge side of a roof side rail portion RR and the upper side of a rear pillar portion RP above the peripheral edges of doors and windows W (W1, W2 and W3) on the interior side of a vehicle V.

The airbag device M1 includes the airbag 12, an inflator 49, mounting brackets 46 and 54 and an airbag cover 10.

This airbag cover 10 is constructed, as shown in FIG. 1, from the individual lower edge sides of a pillar garnish 4 arranged in the front pillar portion FP, and a roof head lining 5 arranged in the roof side rail portion RR. The airbag cover 10 covers the interior side of the airbag 12 when folded and housed. Moreover, the airbag cover 10 is constructed so that is can be pushed and opened into the compartment by the airbag 12 when the airbag 12 is expanded and inflated into the compartment.

Figure 2:
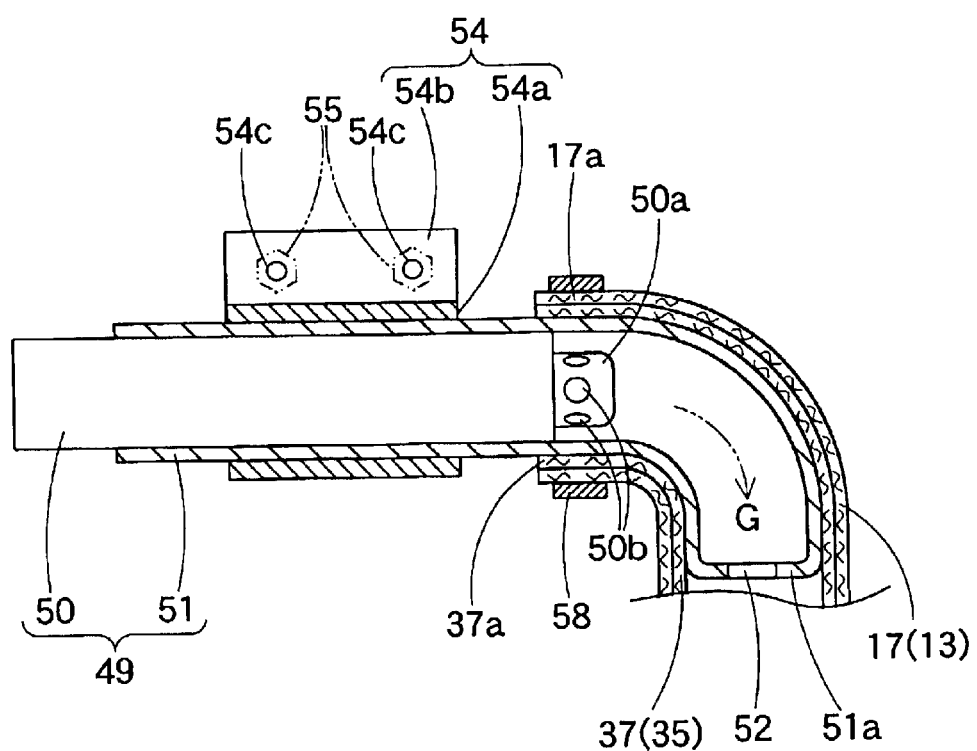
FIG. 2 is a partially enlarged section of an inflator arranging portion in the head protecting airbag device of the first embodiment.
Figure 3:
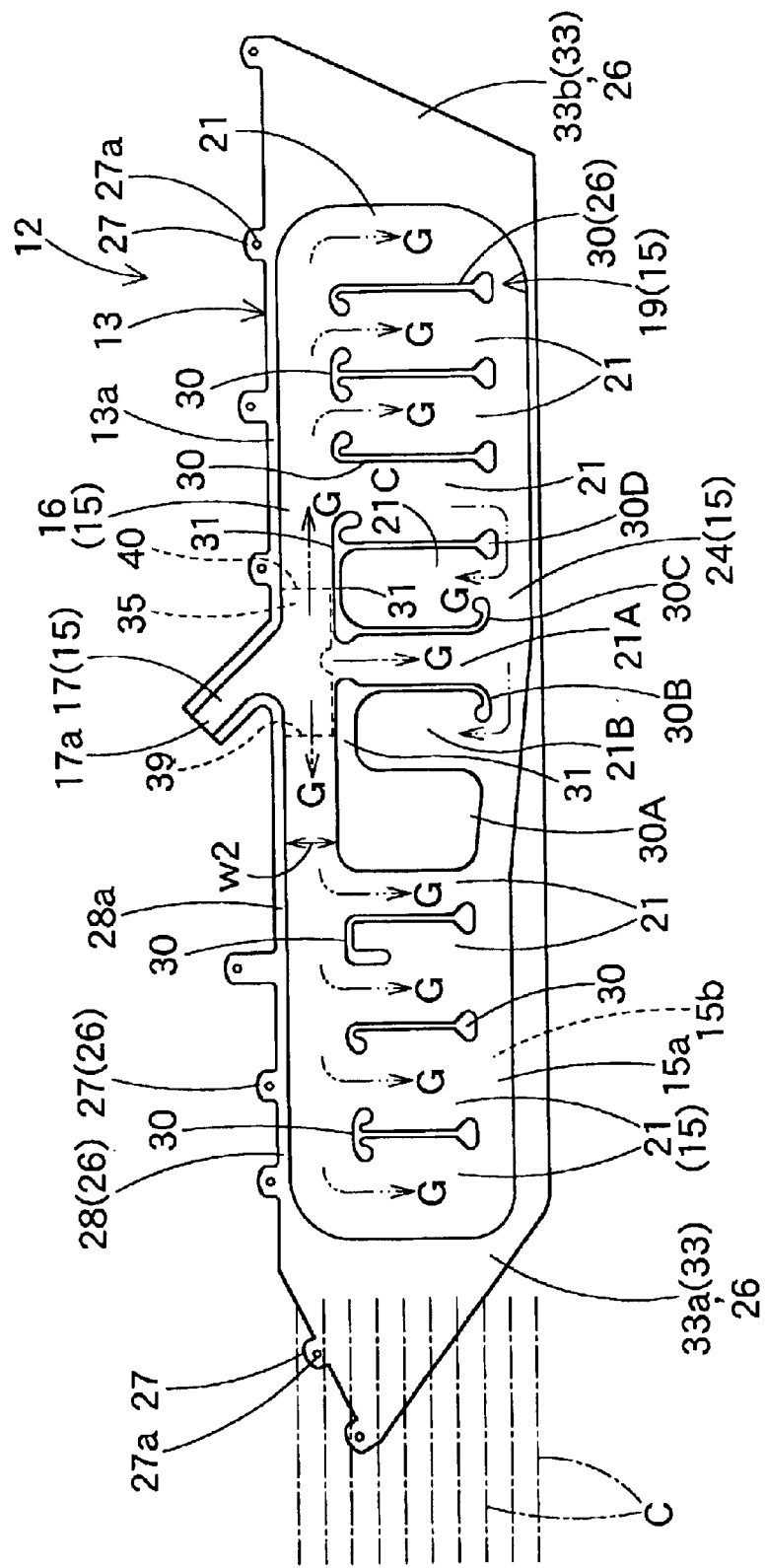
FIG. 3 is a front elevation showing the state in which an airbag to be used in the first embodiment is expanded flat.

The airbag 12 is provided with a flexible airbag body 13 and a current regulating cloth 35, as shown in FIGS. 2 and 3.

The airbag body 13 is manufactured by hollow-weaving polyamide yarns or the like. As shown in FIGS. 1 and 3, the airbag body 13 is expanded from the folded state by admitting the inflating gas G from the inflator 49 so that it is expanded and inflated to cover the interior sides of the windows W (W1, W2 and W3) and the pillar garnishes 6, 7 and 8 in the rear pillar portion RP and intermediate pillar portions P1 and P2. Moreover, the airbag body 13 is constructed of a gas inlet portion 15 for letting the inflating gas G therein, and a non-inlet portion 26 for keeping out inflating gas G. The gas inlet portion 15 that can admit the inflating gas G is created by separating the interior side wall portion 15a and the exterior side wall portion 15b.

The gas inlet portion 15 in the case of the embodiment is provided with a gas feed passage portion 16, a gas inlet port 17, an inflation shielding portion 19 and a communication portion 24.

The gas feed passage portion 16 is arranged in the longitudinal direction of the vehicle V on the side of the upper edge 13a of the airbag body 13. And, the gas feed passage portion 16 is arranged substantially throughout the length of the airbag body 13. Moreover, the gas feed passage portion 16 guides the inflating gas G, as discharged from the inflator 49, to the expansion shielding portion 19 arranged on the lower side thereof. And, the gas inlet port 17 is made to communicate with the gas feed passage portion 16 roughly at its longitudinal middle removed from the vicinities of its front end and rear end. The gas inlet port 17 is protruded upward from the airbag body 13. In the embodiment, the gas inlet port 17 is protruded obliquely upward to the front side. On the other hand, the gas inlet port 17 is opened at its front end 17a. This gas inlet port 17 is mounted on the later-described diffuser 51 of the inflator 49 and is connected to the inflator 49 with the later-described inlet side portion 37 of the current regulating cloth 35 between them. And, the gas inlet port 17 is connected to the diffuser 51 by means of the later-described clamp 58.

The expansion shielding portion 19 includes a plurality of vertical inflation portions 21 lined up in the vehicle longitudinal direction, partitioned by the later-described partition joint portions 30. Each of the vertical inflation portions 21 is inflated in a vertical rod shape by admitting the inflating gas G. And, each vertical inflation portion 21 communicates at its lower end side with the communication portion 24. This communication portion 24 is arranged in the longitudinal direction of the vehicle V on the lower edge 13b side of the airbag body 13. The communication portion 24 is arranged substantially throughout the length of the airbag body 13. Below the gas inlet port 17, the vertical inflation portion 21A is arranged. On the other hand, the vertical inflation portions 21B and 21C, which are arranged adjacent to the vertical inflation portion 21A in the longitudinal direction, are closed on the upper end side by the later-described horizontal joint portions 31. All the remaining vertical inflation portions 21 communicate on their upper end sides with the gas feed passage portion 16.

The non-inlet portion 26 is constructed by being joined to the interior side wall portion 15a and the exterior side wall portion 15b. In the case of the embodiment, the non-inlet portion 26 is provided with mounting portions 27, a peripheral edge joint portion 28, partition joint portions 30 and a board-shaped portion 33.

The peripheral edge joint portion 28 is arranged around and in contact with the gas inlet portion 15. This peripheral edge joint portion 28 is so densely woven as to cause no gas leakage from the gas inlet portion 15.

The mounting portions 27 are arranged in plurality (e.g., nine in the embodiment) such that they are protruded upward from the upper edge side portion 28a of the peripheral edge joint portion 28 at the upper edge 13a of the airbag body 13 and from the upper edge sides of the later-described triangular board portions 33a and 33b of the board portion 33. On each mounting portion 27, there is fixed the mounting bracket 46 for attaching the airbag body 13 to an inner panel 2. In each mounting portion 27, there is formed a mounting hole 27a in which amounting bolt 47 is inserted. And, each mounting portion 27 is fixed for each mounting bracket 46 on the inner panel 2 of a board metal on the side of a body 1 by means of the mounting bolt 47.

The board portion 33 is provided with the triangular board portions 33a and 33b arranged respectively on the front end side and the rear end side of the airbag body 13. The triangular board portion 33a protrudes forward from the front edge side of the peripheral edge joint portion 28. The triangular board-shaped portion 33b protrudes rearward from the rear edge side of the peripheral edge joint portion 28.

The partition joint portions 30 are so arranged in plurality in the longitudinal direction as to partition the individual vertical inflation portions 21 in the region of the inflation shielding portion 19. The partition joint portion 30A, arranged adjacent to the front side of the vertical inflation portion 21B, is formed into a generally rectangular shape. And, the partition joint portions 30 excepting the partition joint portion 30A are formed into a rod shape in the vertical direction. The partition joint portion 30B, arranged between the vertical inflation portions 21A and 21B, is connected near its upper end to the partition joint portion 30A by a horizontal joint portion 31. And, the vertical inflation portion 21B is closed on its upper end side by the horizontal joint portion 31. Moreover, both the partition joint portion 30C arranged between the vertical inflation portions 21A and 21C, and the partition joint portion 30D arranged adjacent to the rear side of the vertical inflation portion 21C, are also jointed near their upper ends by a horizontal joint portion 31. In short, the vertical inflation portion 21C is closed on its upper end side by a horizontal joint portion 31. The individual horizontal joint portions 31 construct the lower side of the gas feed passage portion 16. The individual horizontal joint portions 31 are arranged near the lower edges of the later-described first and second gas outlet holes 39 and 40 of the current regulating cloth 35. In the embodiment, moreover, the individual horizontal joint portions 31 also play the role of a guide portion for guiding the inflating gas G, as released from the first and second gas outlet holes 39 and 40, forward and rearward in the longitudinal direction of the vehicle V. In the embodiment, moreover, the individual partition joint portions 30B and 30C are protruded from near their upper ends from the horizontal joint portions 31, to be adjacent to the vertical inflation portion 21A.

Figure 4:
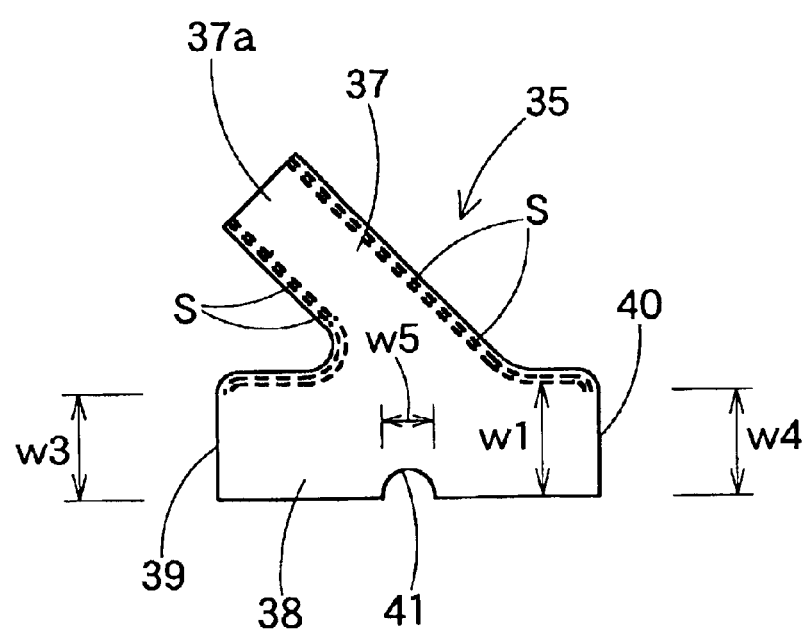
FIG. 4 is a front elevation of a current regulating cloth to be used in the first embodiment.

The current regulating cloth 35 is made of a flexible woven fabric using polyamide yarns or polyester yarns. The current regulating cloth 35 is arranged in the gas inlet port 17, as shown in FIGS. 2, 3 and 4. Specifically, the current regulating cloth 35 is mounted on the diffuser 51 of the inflator 49. The current regulating cloth 35 is provided with the inlet side portion 37 and an outlet side portion 38. The inlet side portion 37 can be connected to the inflator 49. The outlet side portion 38 is arranged near the gas inlet port 17 in the gas feed passage portion 16.

The inlet side portion 37 has a contour generally identical to the inner circumferential shape of the gas inlet port 17 so that it can be inserted into the gas inlet port 17. Moreover, the contour size of the inlet side portion 37 is set slightly smaller than that of the gas inlet port 17. And, the inlet side portion 37 is opened at its front end 37a as in the gas inlet port 17.

The outlet side portion 38 is made to communicate at its generally longitudinal middle portion with the lower end of the inlet side portion 37. And, the outlet side portion 38 is formed into a generally cylindrical shape having its two front and rear ends opened. Specifically, the outlet side portion 38 provide its two individual front and rear end openings for the first and second gas outlet holes 39 and 40. These first and second gas outlet holes 39 and 40 release the inflating gas G injected from the diffuser 51 to the front and the rear along the gas feed passage portion 16. As shown in FIG. 4, moreover, the outlet side portion 38 is constructed such that the vertical width size w1 of the portion to be substantially inflated when the inflating gas G is admitted is made smaller than the vertical width size w2 of the gas feed passage portion 16 in the air bag body 13. In other words, the outlet side portion 38 has a smaller external diameter size when inflated than the internal diameter size of the gas feed passage portion 16 when inflated. Moreover, the opening width sizes w3 and w4 of the first and second gas outlet holes 39 and 40 are made smaller than the width size w1 of the outlet side portion 38. Here in the embodiment, the opening width size w3 of the first gas outlet hole 39 is made substantially equal to the opening width size w4 of the second gas outlet hole 40. In other words, the first gas outlet hole 39 and the second gas outlet hole 40 are set to have substantially equal opening areas when inflated. These first and second gas outlet holes 39 and 40 are individually positioned near the upper sides of the horizontal joint portions 31 when the current regulating cloth 35 is arranged in the airbag body 13.

On the lower side of the outlet side portion 38, between the first gas outlet hole 39 and the second gas outlet hole 40, moreover, there is formed a third gas outlet hole 41 which can release the inflating gas G downward. This third gas outlet hole 41 is opened in a generally circular shape when the current regulating cloth 35 is inflated by admitting the inflating gas G. And, the third gas outlet hole 41 is positioned above the vertical inflation portion 21A when the current regulating cloth 35 is arranged in the air bag body 13. In the embodiment, moreover, the third gas outlet hole 41 has a smaller opening width size w5 than the opening width sizes w3 and w4 of the first and second gas outlet holes 39 and 40.

Figure 5:
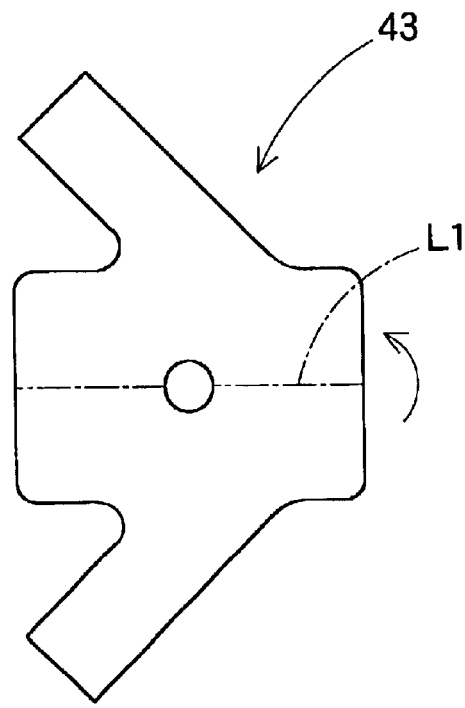
FIG. 5 is a diagram of a manufacturing step of the current regulating cloth of FIG. 4.
Figure 5:
Figure 5:
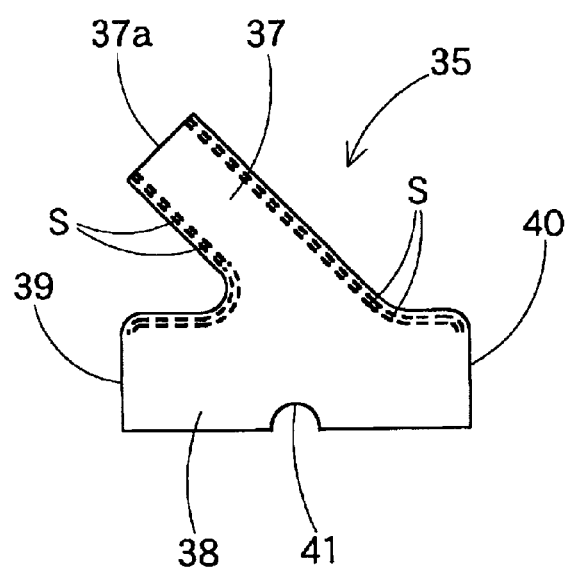

In the embodiment, the current regulating cloth 35 is formed by sewing a current regulating cloth material 43 with a sewing thread S, as shown in FIG. 5. Specifically, the current regulating cloth material 43, forming the current regulating cloth 35 connecting the lower edge sides by folding at fold L1, is folded back on that fold L1, as shown in FIG. 5. And, the peripheral edges excepting the portion for the front end 37a of the inlet side portion 37 and the portions for the first and second gas outlet holes 39 and 40 are sewn to each other with the sewing thread S. At this time, the front and rear ends of the outlet side portion 38 which are the first and second gas outlet holes 39 and 40 are sewn near their upper edges. In other words, the first and second gas outlet holes 39 and 40 are formed to have smaller opening width sizes w3 and w4 than the width size w1 of the outlet side portion 38.

The inflator 49 includes, as shown in FIGS. 1 and 2, a body portion 50 for feeding the inflating gas G to the airbag 12 folded, and the diffuser 51 for guiding the inflating gas G discharged from the body portion 50.

This body portion 50 is formed generally into a column shape having a head portion 50a on the leading end side. In this head portion 50a, moreover, there are arranged a plurality of gas discharge ports 50b for discharging the inflating gas G.

The diffuser 51 is mounted on and connected to the body portion 50. Moreover, the diffuser 51 is inserted into the inlet side portion 37 of the current regulating cloth 35 to guide the inflating gas G discharged from the gas discharge ports 50b. And, the diffuser 51 is formed of a board metal which holds its shape better than the current regulating cloth 35. In other words, the diffuser 51 has higher shape hold ability than the current regulating cloth 35. Moreover, the diffuser 51 is formed into a generally cylindrical shape having a leading end closed. This diffuser 51 injects the inflating gas G discharged from the gas discharge ports 50b of the body portion 50, toward the outlet side portion 38 in the current regulating cloth 35. The diffuser 51 is bent on the side of its leading end 51a toward the lower side (or toward the airbag body 13). In the end face of the leading end 51a of the diffuser 51, moreover, there is arranged one injection port 52 which can inject the inflating gas G downward to the outlet side portion 38. This diffuser 51 has mounted around it the inlet side portion 37 of the current regulating cloth 35 and the gas inlet port 17 of the airbag body 13. And, the diffuser 51 is connected to the airbag 12 by using the clamp 58 which is mounted on the vicinity of the front end 17a of the gas inlet port 17.

Further, the inflator 49 is mounted on the inner panel 2 on the side of the body 1 by means of the mounting bracket 54. This mounting bracket 54 is made of a board metal to have a cylindrical holding portion 54a and a mounting portion 54b. The holding portion 54a clamps the inflator 49 from the outer circumferential side of the diffuser 51. The mounting portion 54b is mounted on the inner panel 2 on the side of the body 1 on the interior side of the roof side rail portion RR by means of mounting bolts 55. In the mounting portion 54b, there are formed mounting holes 54c into which the mounting bolts 55 are inserted.

Here will be described how to mount this airbag device M1 on the vehicle V. First of all, the current regulating cloth 35 is inserted into the air bag body 13. At this time, the current regulating cloth 35 is inserted from the side of the front end 17a of the gas inlet port 17 into the gas feed passage portion 16 and the gas inlet port 17 in the airbag body 13 by using a specified jig. And, at the front end 37a side of the inlet side portion 37 of the current regulating cloth 35 is thermally welded by high-frequency welding or the like to the vicinity of the front end 17a of the gas inlet port 17 where the diffuser 51 is to be mounted. Then, the airbag 12 is manufactured. Next, the airbag body 13 laid flat is folded in a bellows shape having sequential crests and valleys, as shown by single-dotted lines in FIG. 3, to bring the side of the lower end 13b of the airbag body 13 closer to the side of the upper edge 13a. And, a predetermined portion of the airbag body 13 is wrapped, after being folded, with a not-shown breakable tape for preventing it from unfolding. Further, the mounting brackets 46 are attached to the individual mounting portions 27. And, the clamp 58 is mounted in advance on the gas inlet port 17. Moreover, the mounting bracket 54 is also mounted in advance on the inflator 49.

And, the gas inlet port 17 of the airbag body 13 sheathed by the clamp 58 is mounted on the diffuser 51 of the inflator 49 through the inlet side portion 37 of the current regulating cloth 35. After this, the clamp 58 is fastened from the outer circumferential side of the gas inlet port 17 to connect the diffuser 51 and the airbag 12 thereby to form an airbag assembly.

And, the individual mounting brackets 46 and 54 are arranged at and fastened to the predetermined positions of the inner panel 2 by means of the bolts 47 and 55 to attach the airbag assembly to the body 1. Next, the not-shown lead wires extending from a specified inflator activating control unit are connected with the inflator 49. After this, the pillar garnish 4 and the roof head lining 5 are attached to the body 1. Then, the pillar garnishes 6, 7 and 8 are attached to the body 1 so that the airbag device M1 can be mounted on the vehicle V.

If the inflating gas G is activated after the airbag device M1 is mounted on the vehicle V, the inflating gas G from the inflator 49 flows from the gas inlet port 17 into the gas feed passage portion 16, as indicated by double-dotted lines in FIG. 3. Moreover, the inflating gas G flows downward from the gas feed passage portion 16 so that the inflation shielding portion 19 begins inflating while being unfolded. After this, the airbag body 13 breaks the not-shown tape and protrudes to the lower side while pushing and opening the airbag cover 10 on the lower edge sides of the pillar garnish 4 and the roof head lining 5. Thus the airbag body 13 is greatly inflated to cover the interior sides of the windows W1, W2 and W3, the intermediate pillar portions P1 and P2 and the rear pillar portion RP, as indicated by double-dotted lines in FIG. 1.

Figure 6:
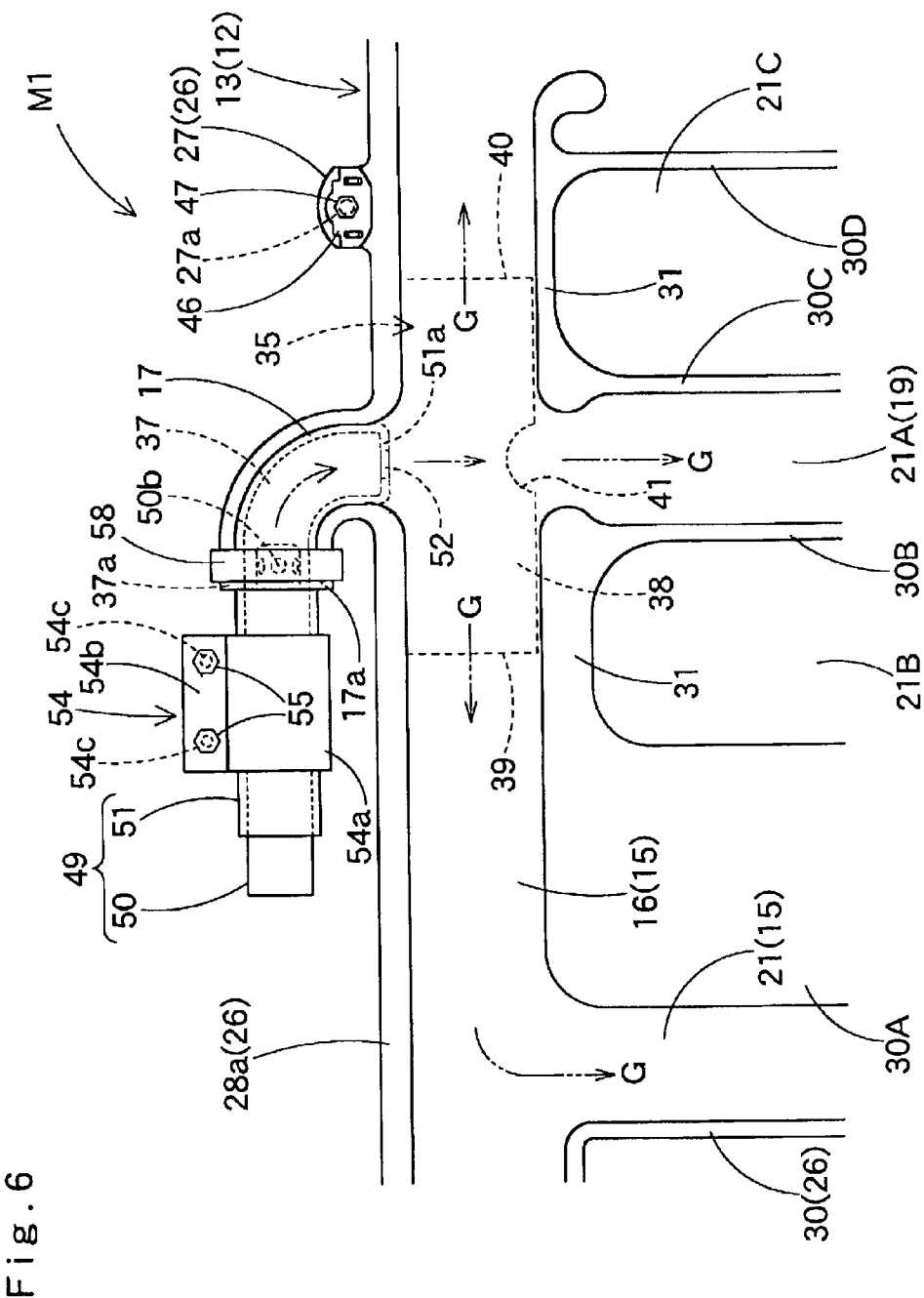
FIG. 6 is a schematic diagram showing the flow state of an inflating gas released from the current regulating cloth in the head protecting airbag device of the first embodiment.

Thus, in the airbag device M1 of the first embodiment, the inflator 49 is connected to one gas inlet port 17 formed in the airbag body 13. The inflating gas G discharged from the inflator 49 is guided into the airbag body 13 in the two longitudinal directions, i.e., forward and backward, of the vehicle V, as shown in FIG. 6, by the current regulating cloth 35 arranged near the gas inlet port 17. Unlike the prior art, therefore, it is unnecessary to arrange two gas inlet ports in the airbag. In the airbag device M1 of the first embodiment, specifically, it is sufficient to arrange one gas inlet port 17 in the airbag 12 and to connect the gas inlet port 17 to the inflator 49. This makes it possible to reduce the number of steps of and lower the cost for manufacturing the airbag device M1.

In the airbag device M1 of the embodiment, moreover, the gas feed passage portion 16 is arranged in the longitudinal direction of the vehicle V. And, the current regulating cloth 35 is provided with the first and second gas outlet holes 39 and 40 capable of releasing the inflating gas G forward and rearward along the gas feed passage portion 16. Therefore, the inflating gas G released from the first and second gas outlet holes 39 and 40 of the current regulating cloth 35 flows the front and rear of the airbag body 13 along the gas feed passage portion 16. Specifically, the inflating gas quickly flows to the two longitudinal end sides of the inflation shielding portion 19 arranged on the lower side of the gas feed passage portion 16. And, whole of the inflation shielding portion 19 can be expanded quickly. As a result, the airbag body 13 can quickly complete its inflation and cover the interior sides of the windows W1, W2 and W3.

Therefore, the airbag device M1 of the embodiment is enabled to reduce the number of steps and lower the cost for the manufacture while retaining the quick inflation characteristics of the airbag 12.

In the airbag device M1 of the first embodiment, on the other hand, the inflating gas G released from the outlet side portion 38 of the current regulating cloth 35 can be guided into the front and rear of the airbag body 13 along the gas feed passage portion 16. Therefore, the outlet side portion 38 of the current regulating cloth 35 need not be arranged substantially all through the gas feed passage portion 16 in the airbag body 13. In other words, it is sufficient to arrange the outlet side portion 38 of the current regulating cloth 35 in the gas feed passage portion 16 near the gas inlet port 17. As a result, the current regulating cloth 35 can be formed compactly and the volume of the upper edge side portion at the time when the airbag 12 is folded can be minimized.

In the airbag device M1 of the first embodiment, moreover, the inflating gas G can be branched and released out forward and rearward along the gas feed passage portion 16 by the current regulating cloth 35 itself. In other words, the airbag device M1 of the first embodiment is not constructed so that the flow of the inflating gas G is mainly changed by the airbag body 13 itself. This makes it possible to suppress the damage to the airbag body 13 by the inflating gas G.

Here in the airbag device M1 of the first embodiment, at the outlet side portion 38 of the current regulating cloth 35, the width size w1 of the portion when fully inflated by the inflating gas G is made smaller than the width size w2 of the gas feed passage portion 16 in the airbag body 13. In short, the external diameter size of the outlet side portion 38 is made smaller than the internal diameter size of the gas feed passage portion 16 in the airbag body 13. Therefore, the outlet side portion 38 in the current regulating cloth 35 is not inflated so much as to expand the gas feed passage portion 16, even when the current regulating cloth 35 admits the inflating gas G and is inflated at the initial stage of inflation of the airbag body 13. As a result, the inflating gas G can be prevented from damaging the airbag body 13. Especially in the first embodiment, the opening width sizes w3 and w4 of the first and second gas outlet holes 39 and 40 formed at the two front and rear ends of the outlet side portion 38 are made smaller than the width size w1 of the outlet side portion 38. At the initial stage of inflation of the airbag body 13, therefore, it is possible to suppress large inflation near the peripheral edges of the first and second gas outlet holes 39 and 40. As a result, the inflating gas G is further prevented from damaging the airbag body 13. If this point is not considered important however, it is natural that the opening width sizes w3 and w4 of the first and second gas outlet holes 39 and 40 may be set substantially equal to the width size w1 of the outlet side portion 38. Moreover, the outer diameter size of the outlet side portion 38 may be set substantially equal to the internal diameter size of the gas feed passage portion 16.

In the airbag device M1 of the first embodiment, further, the third gas outlet hole 41 capable of injecting the inflating gas G downward is arranged in the lower edge side of the outlet side portion 38 or on the lower side between the first gas outlet port 39 and the second gas outlet hole 40 in the outlet side portion 38 of the current regulating cloth 35. Therefore, the inflating gas G discharged from the inflator 49 can be released downward from the third outlet hole 41 into the airbag body 13, as shown in FIG. 6. As a result, in accordance with the downward inflow of the inflating gas G, the airbag body 13 can be quickly inflated downward near the vicinity of its gas inlet port 17 so that it can complete its inflation more quickly. If this point is not considered important however, of course the current regulating cloth may be used need have no third gas outlet hole.

In the airbag device M1 of the first embodiment, moreover, the horizontal joint portions 31 are lined up in the longitudinal direction near the lower edges of the first and second gas outlet ports 39 and 40 of the current regulating cloth 35 in the airbag body 13. At the initial stage of inflation of the airbag body 13, therefore, the lower edge sides of the first and second gas outlet holes 39 and 40 can be supported by the horizontal joint portions 31 when the current regulating cloth 35 admits the inflating gas G and in turn releases the inflating gas G from the first and second gas outlet holes 39 and 40 into the airbag body 13 while itself being inflated. As a result, it is possible to suppress downward motion of current regulating cloth 35 near the first and second gas outlet holes 39 and 40 when the inflating gas G flows out. Thus, it is possible to stabilize the outflow direction of the inflating gas G into the airbag body 13. If this point is not considered important however, the construction to be used may be modified such that no joint portion is arranged near the first and second gas outlet holes 39 and 40 of the current regulating cloth 35.

In the airbag device M1 of the first embodiment, still further, the gas feed passage portion 16 is arranged substantially all along the longitudinal direction of the airbag body 13. Therefore, the inflating gas G which has flowed into the gas feed passage portion 16 can arrive more quickly at the front end side and the rear end side of the airbag body 13. As a result, the inflation shielding portion 19 in the airbag body 13 can be inflated more quickly in its entirety.

Here in the airbag device M1 of the first embodiment, the inflator 49 used comprises the body portion 50 and the diffuser 51. Therefore, the inflating gas G discharged from the body portion 50 of the inflator 49 can be injected toward the outlet side portion 38 in the current regulating cloth 35 by the diffuser 51. In other words, the damage to the current regulating cloth 35 can be suppressed at the time of expansion and inflation of the airbag 12. If this point is not considered important, a inflator with no diffuser can be used.

Figure 7:
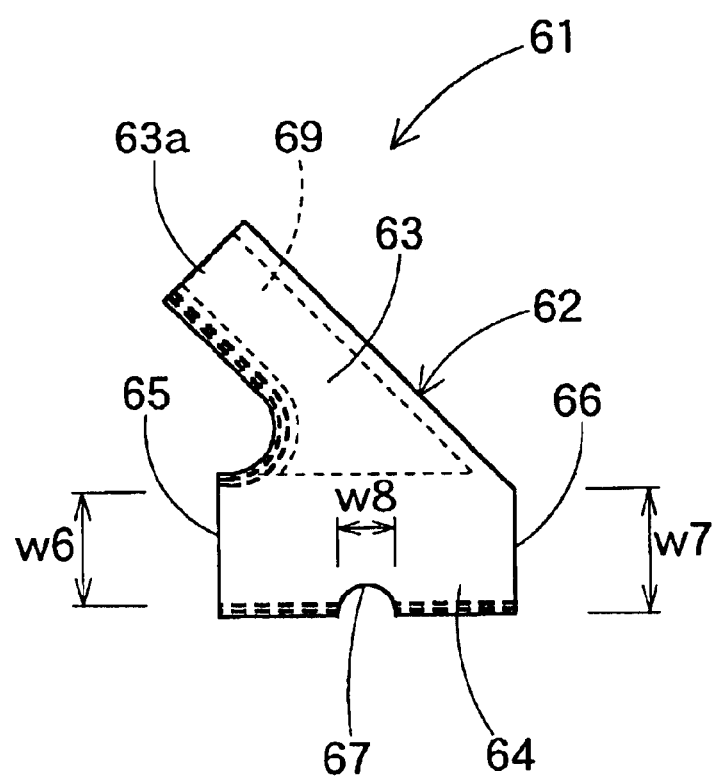
FIG. 7 is a front elevation showing a modified current regulating cloth to be used in the head protecting airbag device of the first embodiment.

Moreover, a current regulating cloth 61 to be inserted into the airbag body 13 of the first embodiment may have a construction shown in FIG. 7.

This current regulating cloth 61 is provided with a current regulating cloth body 62 and a cylindrical reinforcing cloth 69. The current regulating cloth body 62 is provided with an inlet side portion 63 and an outlet side portion 64. The reinforcing cloth 69 is arranged on the inner side of the inlet side portion 63 in the current regulating cloth body 62. Both the current regulating cloth body 62 and the reinforcing cloth 69 are made of a flexible woven fabric of polyamide yarns or polyester yarns.

The inlet side portion 63 in the current regulating cloth body 62 is given a construction like that of the inlet side portion 37 in the aforementioned current regulating cloth 35. Specifically, the inlet side portion 63 of the current regulating cloth body 62 is given a contour shape substantially identical to the inner circumferential shape of the gas inlet port 17 so that it can be inserted into the gas inlet port 17. Further, the inlet side portion 63 is formed to have a contour size slightly smaller than the size of the gas inlet port 17. Moreover, the inlet side portion 63 is constructed with its front end 63a opened out.

The outlet side portion 64 is made to communicate with the lower end of the inlet side portion 63 at the longitudinal middle of outlet side portion 64. And, the outlet side portion 64 is formed into a generally cylindrical shape having its two front and rear ends opened to form first and second gas outlet holes 65 and 66 respectively. These first and second gas outlet holes 65 and 66 are formed with opening width sizes w6 and w7 smaller than the width size w2 of the gas feed passage portion 16 in the airbag body 13. Moreover, the opening width sizes w6 and w7 of the first and second gas outlet holes 65 and 66 are substantially equal to each other. In other words, the first gas outlet hole 65 and the second gas outlet hole 66 are set to have the substantially equal opening areas at the time of inflation. In the lower edge side of the outlet side portion 64, between the lower sides of the first gas outlet hole 65 and the second gas outlet hole 66, moreover, there is formed a third gas outlet hole 67, which can inject the inflating gas G downward. This third gas outlet hole 67 is formed to have a smaller opening width size w8 than the opening width sizes w6 and w7 of the first and second gas outlet holes 65 and 66.

The reinforcing cloth 69 is given a contour shape substantially identical to the inner circumferential shape of the inlet side portion 63 so that it can be inserted into the inlet side portion 63. And, the reinforcing cloth 69 is formed into a generally cylindrical shape having a slightly smaller contour size than the size of the inlet side portion 63 and opened at its upper end side and lower end side.

Figure 8:
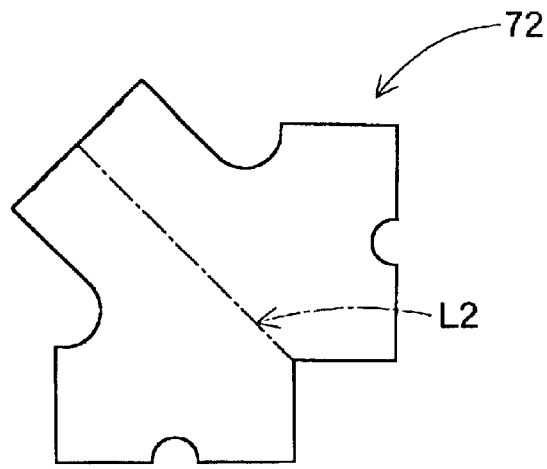
FIG. 8 is a diagram of a manufacturing step of the current regulating cloth of FIG. 7.
Figure 8:
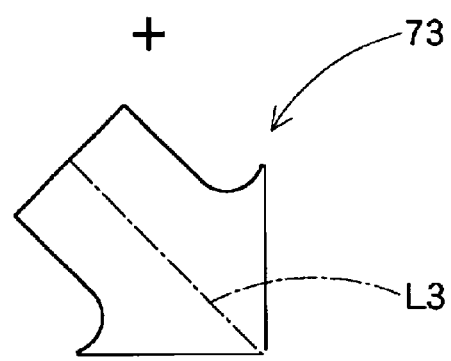
Figure 8:
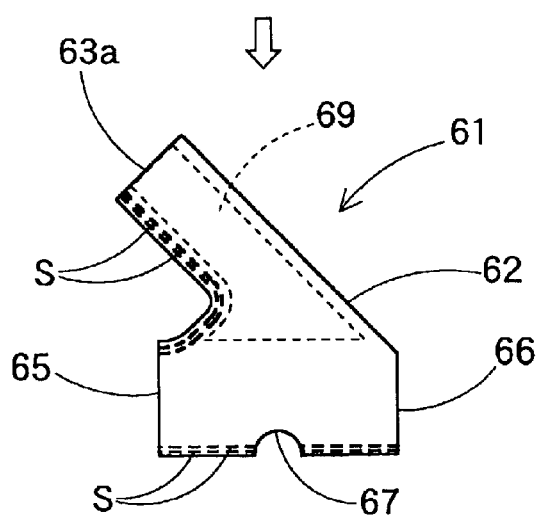

As shown in FIG. 8, the current regulating cloth 61 is formed by sewing a current regulating cloth material 72 and a reinforcing cloth material 73 with a sewing thread S. Specifically, the current regulating cloth material 72, which is shaped by connecting the rear edge sides of the inlet portion 63 of the current regulating cloth 61 to form a fold L2, is folded back along this fold L2, as shown in FIG. 8. At the same time, the reinforcing cloth material 73, which is shaped by connecting the rear edge sides of the reinforcing cloth 69 to form a fold L3, is folded back along this fold L3. After this, the reinforcing cloth material 73 is arranged by sandwiching it in the current regulating cloth material 72 and is sewn with the sewing thread S at its peripheral edges excepting the portion for the front end 63a of the inlet side portion 63 and the portions for the first, second and third gas outlet holes 65, 66 and 67. At this time, the front edge side of the reinforcing cloth 69 is sewn together with the front edge side of the inlet side portion 63 in the reinforcing cloth body 62 with the sewing thread S.

With the current regulating cloth 61 being thus constructed, the inner peripheral side of the inlet side portion 63 is covered with the reinforcing cloth 69. Therefore, it is possible to further suppress the damage to the inlet side portion 63 of the reinforcing cloth body 62 by the high temperature inflating gas G.

Next will be described an airbag device M2 according to a second embodiment of the invention. This airbag device M2 is given a construction similar to the construction of the aforementioned airbag device M1 excepting an airbag 76 and a diffuser 90 in an inflator 89. Therefore, similar members will be omitted from description, designating them with the same reference numerals.

Figure 12:
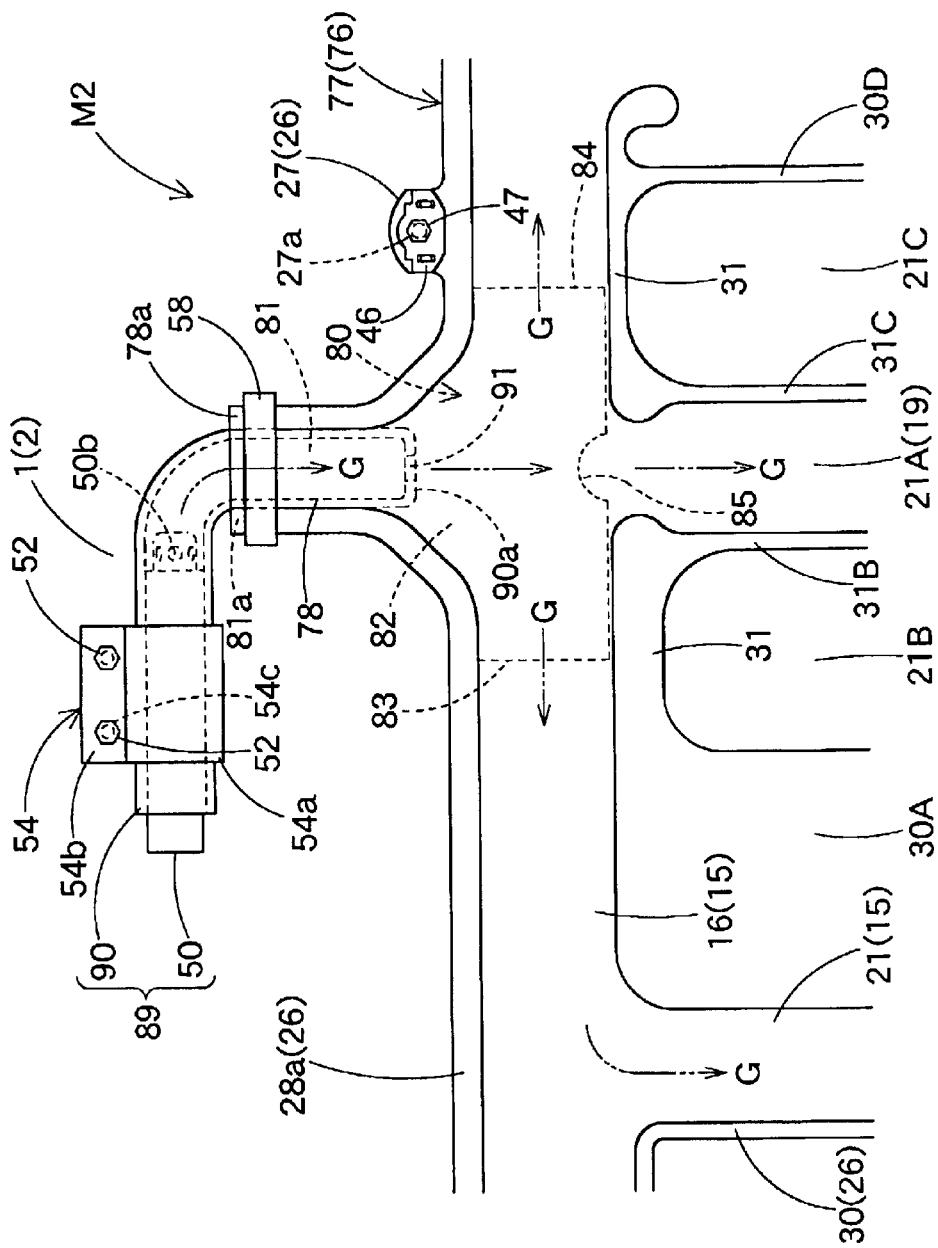
FIG. 12 is a schematic diagram showing the flow state of an inflating gas released from the current regulating cloth in the head protecting airbag device of the second embodiment.

The airbag 76 is provided, like the airbag 12 of the first embodiment, with a flexible airbag body 77 and a current regulating cloth 80. The air bag body 77 is given a construction similar to that of the airbag body 13 in the aforementioned airbag device M1 excepting the shape of a gas inlet port 78, as shown in FIG. 12. Therefore, similar members will be omitted from description, designating them with the same reference numerals.

The gas inlet port 78 in the airbag body 77 is protruded upward roughly at the longitudinal middle, at a portion removed from the front end and the rear end of the gas feed passage portion 16, as shown in FIG. 12. And, the gas inlet port 78 is opened at its upper end 78a.

Figure 10:
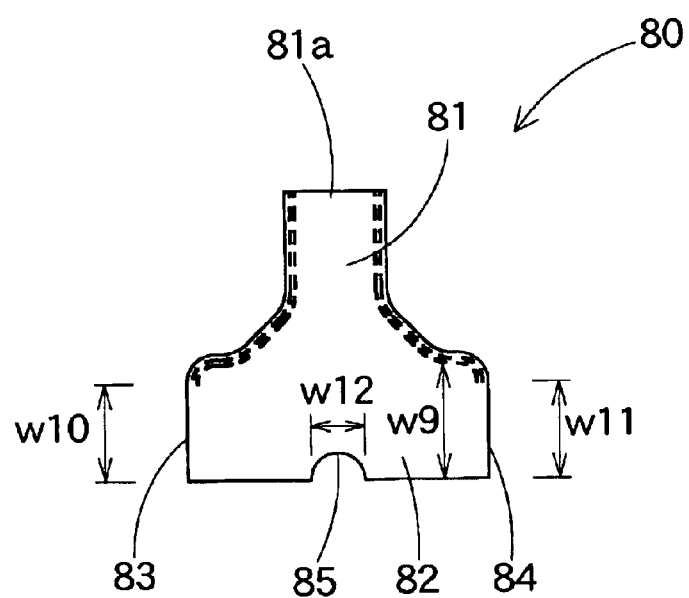
FIG. 10 is a front elevation of a current regulating cloth to be used in the second embodiment.

The current regulating cloth 80 is formed like the aforementioned current regulating cloths 35 and 61, of a flexible woven fabric of polyamide yarns or polyester yarns. The current regulating cloth 80 is provided with an inlet side portion 81 and an outlet side portion 82, as shown in FIG. 10. The inlet side portion 81 is arranged in the gas inlet port 78 of the airbag body 77. The outlet side portion 82 is arranged in the vicinity of the gas inlet port 78 in the gas feed passage portion 16.

The inlet side portion 81 is given a construction similar to that of the inlet side portion 37 in the aforementioned current regulating cloth 35. Specifically, the inlet side portion 81 is given a contour shape substantially identical to the inner circumferential shape of the gas inlet port 78 so that it can be inserted into the gas inlet port 78. And, the inlet side portion 81 is formed to have a contour size slightly smaller than the size of the gas inlet port 78. Moreover, the inlet side portion 81 is opened at its upper end 81a.

The outlet side portion 82 communicates roughly at its longitudinal middle with the lower end of the inlet side portion 81. And, the outlet side portion 82 has openings at its two front and rear ends, the first and second gas outlet holes 83 and 84. In the outlet side portion 82, like the outlet side portion 38 in the aforementioned current regulating cloth 35, the portion to be substantially inflated when the inflating gas G is admitted is given a width size w9 smaller than the width size w2 of the gas feed passage portion 16 in the airbag body 77. Moreover, the opening width sizes w10 and w11 of the first and second gas outlet holes 83 and 84 are made smaller than the width size w9 of the outlet side portion 82. And, the opening width sizes w10 and w11 of the first and second gas outlet holes 83 and 84 are made substantially equal to each other. In other words, the first gas outlet hole 83 and the second gas outlet hole 84 are set to have substantially equal opening areas at the time of inflation. In the lower edge side of the outlet side portion 82, between the lower sides of the first gas outlet hole 83 and the second gas outlet hole 84, there is formed a third gas outlet hole 85, which can inject the inflating gas G downward. The third gas outlet hole 85 is formed to have an opening width size w12 smaller than the opening width sizes w10 and w11 of the first and second gas outlet holes 83 and 84. In the current regulating cloth 80, too, the first and second gas outlet holes 83 and 84 are individually positioned near the upper side of the horizontal joint portion 31 when the current regulating cloth 80 is arranged in the airbag body 77. At this time, the third gas outlet hole 85 is likewise positioned above the vertical inflation portion 21A.

Figure 11:
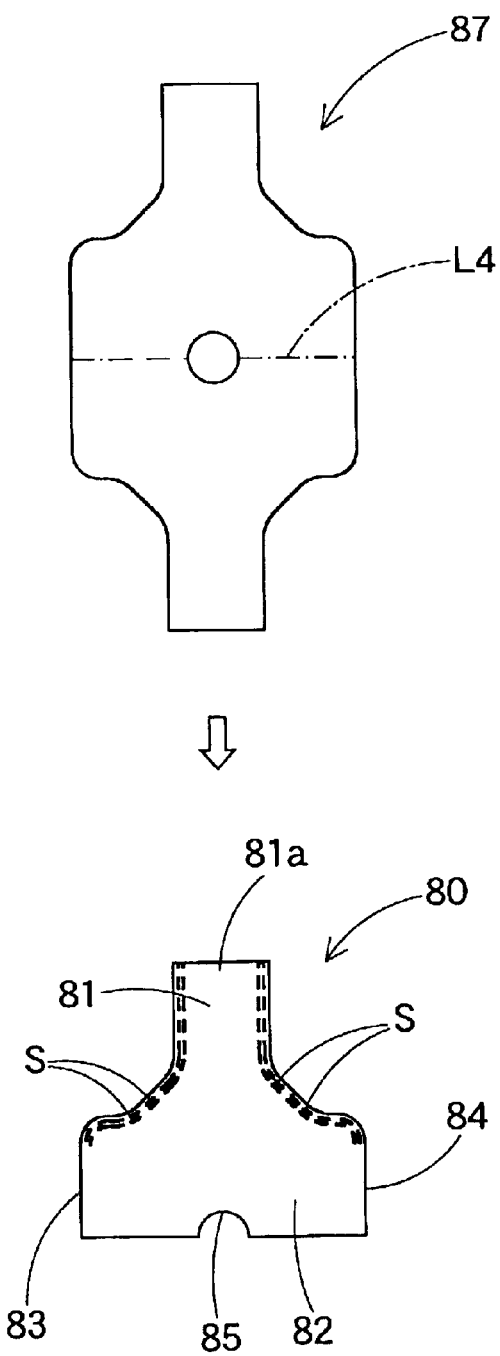
FIG. 11 is a diagram of a manufacturing step of the current regulating cloth of FIG. 10.

This current regulating cloth 80 is formed like the aforementioned current regulating cloth 35. Specifically, a current regulating cloth material 87, which is shaped by connecting the lower edge sides of the current regulating cloth 80 to form a fold L4, is folded at first along this fold L4, as shown in FIG. 11. After this, the current regulating cloth 80 is formed by sewing the peripheral, excepting the portion for the upper end 81a of the inlet side portion 81 and the portions for the first and second gas outlet holes 83 and 84, to each other with the sewing thread S. At this time, the front and rear ends of the outlet side portion 82 which are the first and second gas outlet holes 83 and 84 are sewn near their upper edges like the outlet side portion 38 in the aforementioned current regulating cloth 35. Specifically, the first and second gas outlet holes 83 and 84 are formed to make the opening width sizes w10 and w11 smaller than the width size w9 of the outlet side portion 82.

Figure 9:
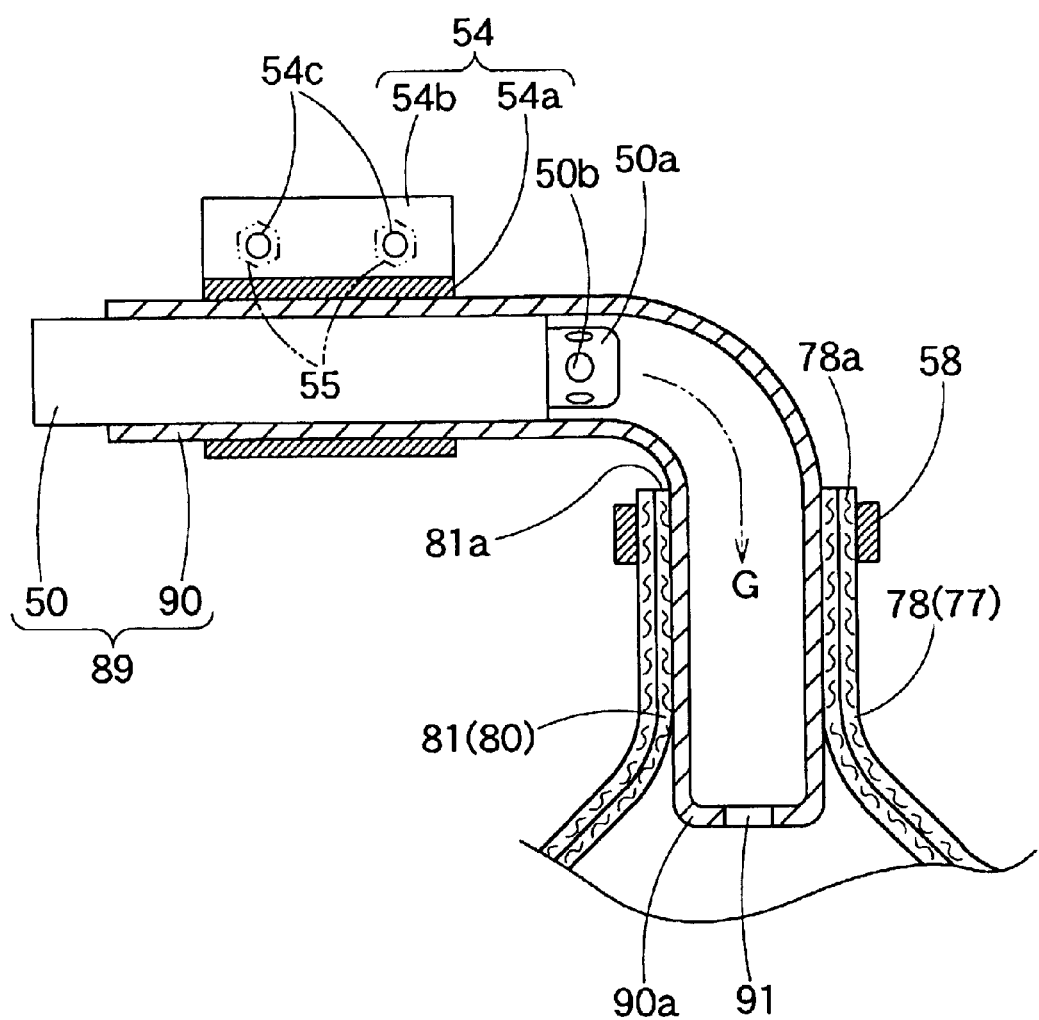
FIG. 9 is a partially enlarged section of an inflator arranging portion of a head protecting airbag device of a second embodiment.

In the airbag device M2, the body portion 50 used in the inflator 89 has a construction similar to that of the aforementioned airbag device M1. And, the diffuser 90 to be used in the inflator 89 of the airbag device M2 is formed into a generally cylindrical shape having its leading end closed, so that it can be mounted on the body portion 50, as shown in FIG. 9. The diffuser 9 is formed of a board metal that holds shape better than the current regulating cloth 80. Moreover, the diffuser 90 is bent near its leading end 90a toward the lower side (or toward the airbag body 77). In the end face of the leading end 90a of the diffuser 90, there is arranged one injection port 91, which can inject the inflating gas G downward toward the outlet side portion 82. This diffuser 90 is formed by making the length of the portion bent downward larger than that of the aforementioned diffuser 51.

The airbag device M2 thus constructed can be mounted on the vehicle like the aforementioned airbag device M1. In this airbag device M2, moreover, when the airbag body 77 is expanded and inflated, the inflating gas G discharged from the inflator 89 is released into the airbag body 77 from the first, second and third gas outlet holes 83, 84 and 85 formed in the current regulating cloth 80, as shown in FIG. 12. And, the airbag device M2 thus constructed can attain actions and effects similar to those of the aforementioned airbag device M1.

Figure 13:
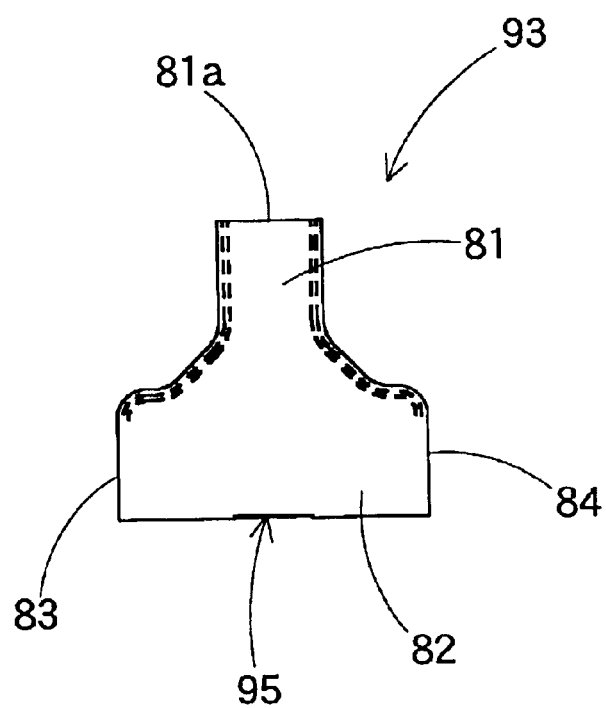
FIG. 13 is a front elevation showing a modified current regulating cloth to be used in the head protecting airbag device of the second embodiment.

Moreover, a current regulating cloth 93 to be inserted into the airbag body 77 may be modified to have the construction shown in FIG. 13. This current regulating cloth 93 has a third gas outlet hole 95 formed into a slit shape. Here, this current regulating cloth 93 has a construction similar to that of the aforementioned current regulating cloth 80 excepting the shape of the third gas outlet hole 95. Therefore, similar members will be omitted from description, designating them with the same reference numerals.

Here will be described an airbag device M3 according to a third embodiment of the invention. This airbag device M3 has a construction similar to that of the aforementioned airbag device M1 excepting an airbag 98, an inflator 109, mounting brackets 119 and a current regulating cloth 102. Therefore, similar members will be omitted from description by designating them by the same reference numerals.

Figure 14:
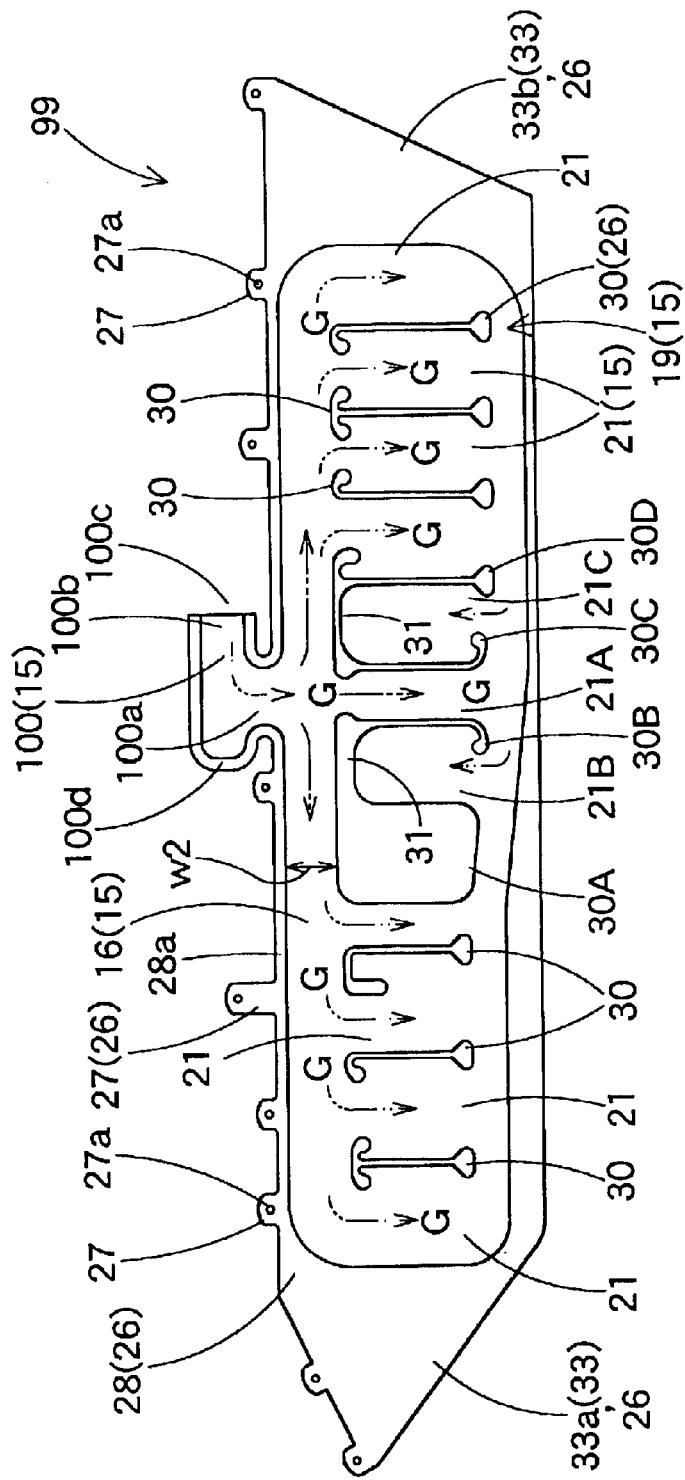
FIG. 14 is a front elevation showing the state the airbag body to be used in a head protecting airbag device of a third embodiment is expanded flat.

The airbag 98 includes, like the airbag 12 of the first embodiment, a flexible airbag body 99 and the current regulating cloth 102. The airbag body 99 is given a construction similar to that of the airbag body 13 in the aforementioned airbag device M1 excepting the shape of a gas inlet port 100, as shown in FIG. 14. Therefore, similar members will be omitted from description by designating them by the same reference numerals.

The gas inlet port 100 in the airbag body 99 is protruded upward roughly at the longitudinal middle, removed from the front end and the rear end of the gas feed passage portion 16, as shown in FIG. 14. This gas inlet port 100 is formed generally into a T-shape, which is composed of a vertical cylinder portion 100a extending upward, and a horizontal cylinder portion 100b extending forward and rearward at the upper end of the vertical cylinder portion 100a. And, the gas inlet port 100 is opened at the rear end 100c of the horizontal cylinder portion 100b.

Figure 16:
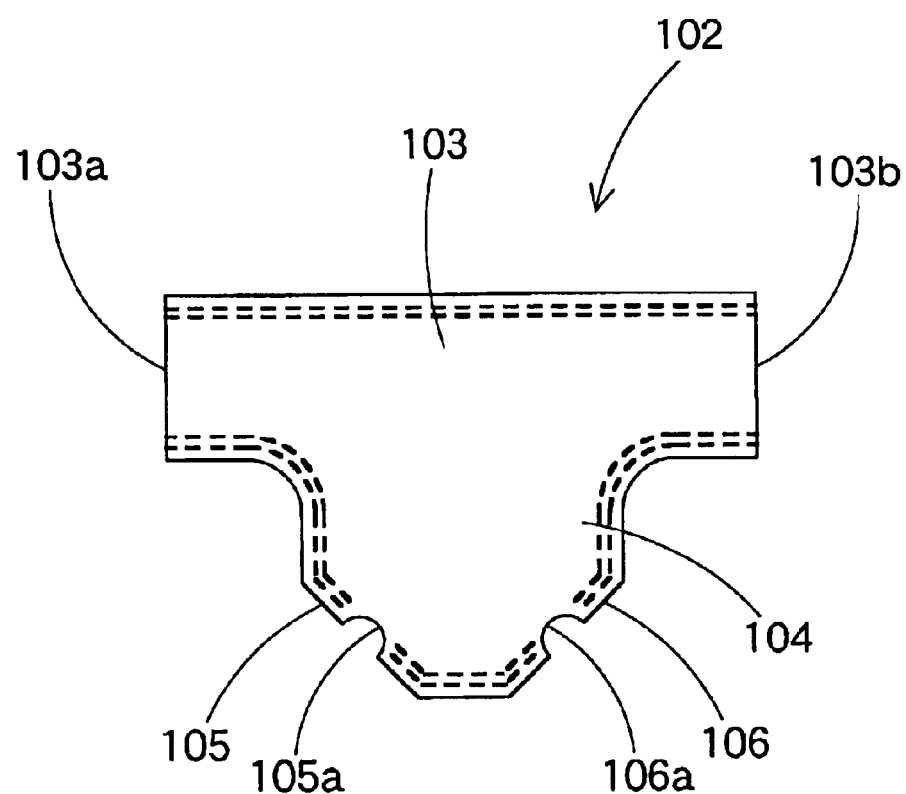
FIG. 16 is a front elevation of a current regulating cloth to be used in the third embodiment.

The current regulating cloth 102 is formed, like the aforementioned current regulating cloth 35, of a flexible woven fabric of polyamide yarns and polyester yarns. The current regulating cloth 102 is provided with an inlet side portion 103 and an outlet side portion 104, as shown in FIG. 16. The inlet side portion 103 is arranged in the gas inlet port 100 of the airbag body 99. The outlet side portion 104 is arranged at a portion near the gas inlet port 100 of the gas feed passage portion 16.

The inlet side portion 103 is formed into a shape generally identical to the inner circumferential shape of the horizontal cylinder portion 100b of the gas inlet port 100 so that it can be inserted into the horizontal cylinder portion 100b. Moreover, the inlet side portion 103 is formed to have a contour size slightly smaller than the size of the horizontal cylinder portion 100b. And, the inlet side portion 103 is constructed to have a front end 103a and a rear end 103b opened in which the inflator 109 is inserted. Specifically, the inlet side portion 103 is constructed so that inflator 109 can be inserted, when the inflator 109 is assembled with the airbag 98, so that the current regulating cloth 102 may be supported by the inflator 109. Moreover, the inlet side portion 103 is fixed near its front end 103a and its rear end 103b together with the inflator 109 and the horizontal cylinder portion 100b of the airbag body 99 by the later-described mounting brackets 119.

The outlet side portion 104 communicates on its upper end side with the inlet side portion 103 extending to the front and rear. Moreover, the outlet side portion 104 is protruded on its lower end to the side of the gas feed passage portion 16 from the vertical cylinder portion 100a of the gas inlet port 100. And, the outlet side portion 104 is arranged roughly at the longitudinal middle on the lower edge side of the inlet side portion 103.

The outlet side portion 104 is provided near the front of its lower edge with a slope portion 105, which is sloped to rise toward the front. In this slope portion 105, moreover, there is formed a first gas outlet hole 105a, which can release the inflating gas G to the front side obliquely to the longitudinal direction of the airbag body 99. Specifically, the first gas outlet hole 105a is constructed to slope its opening face obliquely forward from the vertical direction when the inflating gas G flows in. On the other hand, the outlet side portion 104 is provided near the rear edge side of its lower edge with a slope portion 106, which is sloped to rise toward the rear side. In this slope portion 106, moreover, there is formed a second gas outlet hole 106a, which can release the inflating gas G obliquely downward to the rear side in the longitudinal direction of the airbag body 99. Specifically, the second gas outlet hole 106a is constructed to slope its opening face obliquely rearward from the vertical direction when the inflating gas G flows in.

These first and second gas outlet holes 105a and 106a are opened to be roughly circular when the current regulating cloth 102 is inflated by admitting the inflating gas G. And, the first gas outlet hole 105a and the second gas outlet hole 106a are formed to have generally equal opening areas. In the embodiment, moreover, the first and second gas outlet holes 105a and 106a are individually arranged to release the inflating gas G toward the upper edge sides of the horizontal joint portions 31 when the current regulating cloth 102 is arranged in the airbag body 99.

This current regulating cloth 102 is formed by overlapping two sheets of current regulating cloth materials of identical shapes and by sewing the peripheral edges excepting the portions for the two front and rear ends 103a and 103b of the inlet side portion 103 and the portions for the first and second gas outlet holes 105a and 106a, to each other with the sewing thread S.

Figure 15:
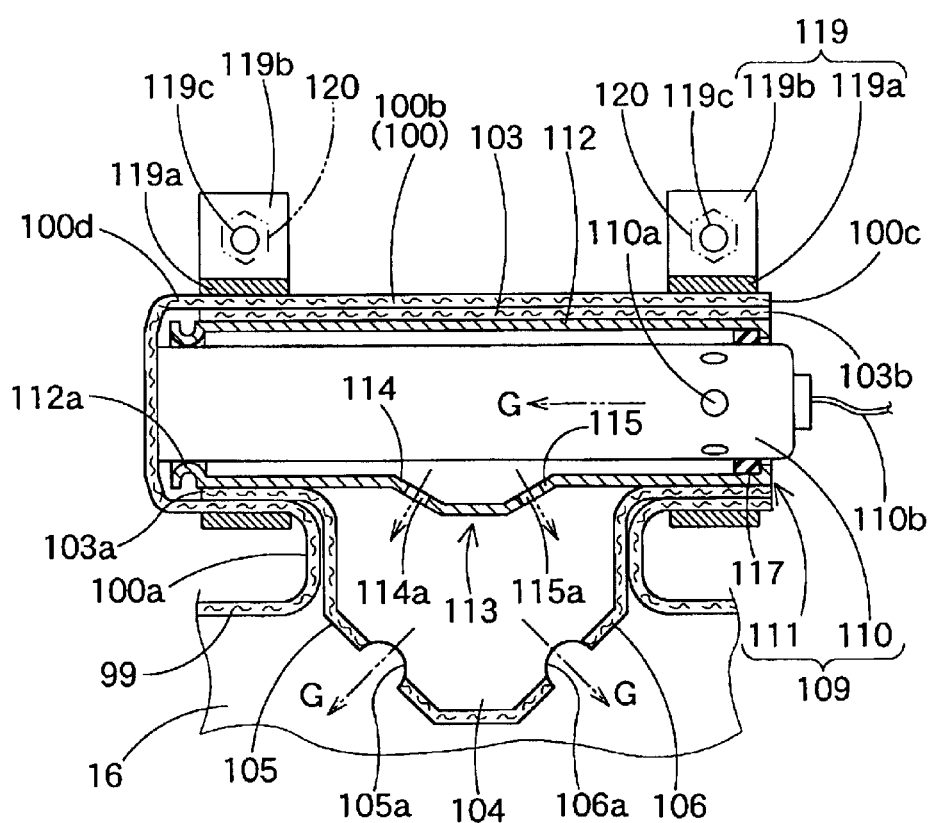
FIG. 15 is a partially enlarged section of an inflator arranging portion in the head protecting airbag device of the third embodiment.

The inflator 109 to be used in the airbag device M3 is provided with a body portion 110 and a diffuser 111. The body portion 110 is different from the body portion 50 used in the airbag devices M1 and M2 of the first and second embodiments, in that it does not use the hot inflating gas. The body portion 110 of the inflator 109 used in the airbag device M3 of the third embodiment is of the stored gas type using a charged cold gas. The body portion 110 is formed into a generally column shape, as shown in FIG. 15. In the circumferential wall on the end portion (or the rear end portion) of the body portion 110, there are formed a plurality of gas discharge ports 110a capable of discharging the inflating gas G. Moreover, lead wires 110b are connected to the end face of the body portion 110 on the side near the gas discharge ports 110a.

The diffuser 111 is formed into such a generally cylindrical shape as can be mounted on the body portion 110. The diffuser 111 is made of a board metal and holds shape better than the current regulating cloth 102. Moreover, the diffuser 111 is provided with a cylinder portion 112, and a packing 117 for preventing the gas leakage from the end portion of the diffuser 111 at the time when the diffuser 111 is assembled with the body portion 110. The cylinder portion 112 sheaths substantially the entire outer circumference of the body portion 110. The packing 117 is arranged and forced to contact with the outer circumference of the cylinder portion 112 near the end portion (or the rear end) on the side of the gas discharge ports 110a.

Near the longitudinal middle of the cylinder portion 112, there is formed a protrusion portion 113 which is protruded downward to the side of the outlet side portion 104 (or to the side of the airbag body 99). On the vehicular front and rear sides of the protrusion portion 113, respectively, there are formed first and second sloped wall portions 114 and 115. In the first sloped wall portion 114, there is formed a first injection port 114a, which can inject the inflating gas G discharged from the body portion 110, obliquely downward to the front side in the longitudinal direction of the airbag body 99. In the second sloped wall portion 115, there is formed a second injection port 115a, which can inject the inflating gas G discharged from the body portion 110, obliquely downward to the rear side in the longitudinal direction of the airbag body 99. Throughout the circumference near the side of the leading end (or the front end) of the cylinder portion 112, there is formed a recessed ridge portion 112a which forcibly contacts with body portion 110. This recessed ridge portion 112a is arranged for preventing the gas leakage from the diffuser 111. In other words, the diffuser 111 is closed on its front end side by the recessed ridge portion 112a and on its rear end side by the packing 117. And, the diffuser 111 is so assembled with the body portion 110 that the inflating gas G discharged from the gas discharge ports 11a of the body portion 110 may be prevented from leaking and may be injected from the first and second injection ports 114a and 115a.

The mounting brackets 119 for attaching the inflator 109 to the inner panel 2 on the side of the body 1 are arranged near the front end 100d and near the rear end 100c of the horizontal cylinder portion 100b, as located on the sides of the leading end (or the front end) and the root portion (or the rear end) of the inflator 109, as shown in FIG. 15. Each mounting bracket 119 comprises a holding portion 119a and a mounting portion 119b. The holding portion 119a is formed into a cylinder shape. This holding portion 119a is constructed to clamp the outer circumferential side of the diffuser 111 through the inlet side portion 103 of the current regulating cloth 102 and the horizontal cylinder portion 100b in the gas inlet port 100 of the airbag body 99. The mounting portions 119b are attached to the inner panel 2 on the side of the body 1 on the interior side of the roof side rail portion RR by using mounting bolts 120. In the mounting portions 119b, there are formed mounting holes 119c in which the mounting bolts 120 are inserted.

Figure 17:
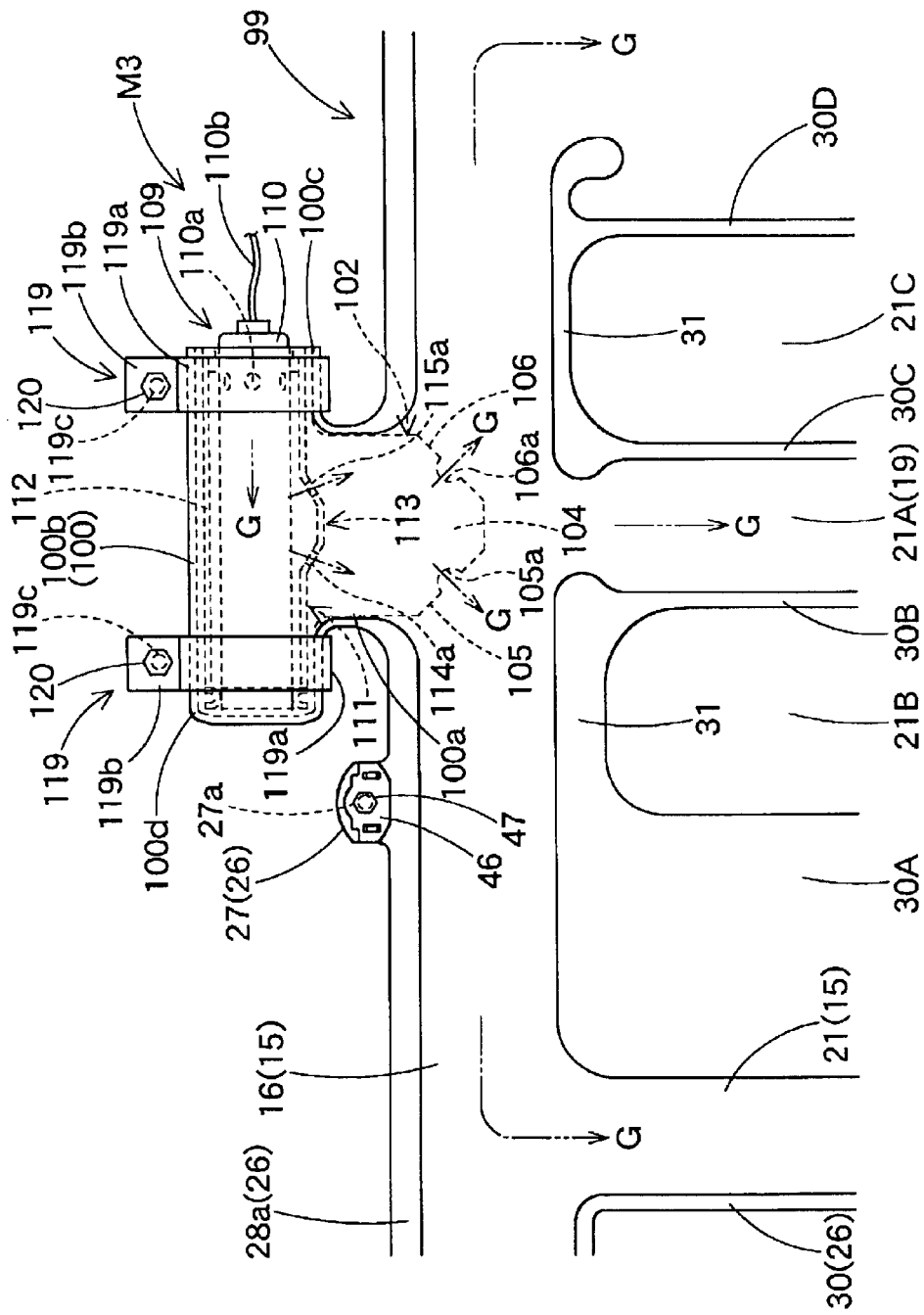
FIG. 17 is a schematic diagram showing the flow state of an inflating gas released from the current regulating cloth in the head protecting airbag device of the third embodiment.

In the airbag device M3 thus constructed, the current regulating cloth 102 is inserted in advance into the airbag body 99 so that the outlet side portion 104 may be arranged in the vertical cylinder portion 100a of the gas inlet port 100. And, the inflator 109 is pushed from its rear end 100c into the gas inlet port 100 of the airbag body 99. Next, the mounting brackets 119 and 119 are arranged near the front end 100d and near the rear end 100c in the horizontal cylinder portion 100b of the gas inlet port 100, and the inflator 109 is connected to the airbag 98. After this, the airbag device M3 can be mounted like the aforementioned airbag device M1 on the vehicle. In the airbag device M3, moreover, when the airbag body 99 is expanded and inflated, the inflating gas G, as discharged from the inflator 109, is released into the airbag body 99 from the first and second gas outlet holes 105a and 106a formed into the current regulating cloth 102, as shown in FIG. 17.

In the airbag device M3, moreover, the opening faces of the first and second gas outlet holes 105a and 106a in the outlet side portion 104 of the current regulating cloth 102 are sloped forward and rearward respectively from the vertical direction when the inflating gas G is released. In other words, the inflating gas G spurting from the first and second gas outlet holes 105a and 106a is released in the two directions, i.e., downward and to the front side, and downward and to the rear side in the longitudinal direction of the airbag body 99. Therefore, the flows of the inflating gas G to the front side and the rear side in the vehicular longitudinal direction can be retained, even if the outlet side portion 104 of the current regulating cloth 102 is not arranged to go deeply into the gas feed passage portion 16. As a result, the current regulating cloth 102 can be made more compact. With this construction of the current regulating cloth 102, moreover, when the airbag body 99 is folded, the volume of the portion near the gas inlet port 100 can be reduced to allow compact folding of the airbag 98.

In the airbag device M3, moreover, the inflator 109 is provided with the body portion 110 and the diffuser 111. Specifically, the inflating gas G discharged from the body portion 110 of the inflator 109 can be injected by the diffuser 111 toward the outlet side portion 104 in the current regulating cloth 102. This makes it possible to suppress the damage to the current regulating cloth 102 when the airbag 98 is expanded and inflated. In the airbag device M3, moreover, when the inflator 109 is assembled with the airbag 98, the inflator 109 is inserted into the inlet side portion 103 to support the current regulating cloth 102 by the diffuser 111 of the inflator 109. This construction makes it easy to fix the current regulating cloth 102.

In the airbag device M3, moreover, the diffuser 111 is provided with the two injection ports 114a and 115a capable of injecting the inflating gas G in the two directions, i.e., obliquely downward to the front side and to the rear side in the longitudinal direction of the airbag body 99 on the side of the outlet side portion 104. Therefore, the inflating gas G, as discharged from the body portion 110 of the inflator 109, can be injected in the two directions, i.e., obliquely downward to the front side and to the rear side in the longitudinal direction of the airbag body 99 by the diffuser 111. In other words, the construction to branch the inflating gas G in the two longitudinal directions of the vehicle need not be made exclusively by the current regulating cloth 102. Therefore, the current regulating cloth 102 can be easily manufactured without setting strict requirements for the strength of the current regulating cloth 102.

Here in the airbag device M3 of the embodiment, the first and second gas outlet holes 105a and 106a in the outlet side portion 104 are arranged to release the inflating gas G toward the upper edge side of the horizontal joint portions 31. Therefore, the inflating gas G released from the first and second gas outlet holes 105a and 106a is guided to the front side and to the rear side in the longitudinal direction of the vehicle by the horizontal joint portions 31 so that it can quickly reach the front end side and the rear end side of the airbag body 99. This makes it possible to inflate the inflation shielding portion 19 in the airbag body 99 quickly.

In the airbag device M3, too, it is only necessary to connect the one gas inlet port 100 and the inflator 109 because only one gas inlet port 100 is formed in the airbag body 99. This makes it possible to reduce the number of steps of and lower the cost for manufacturing the airbag device M3. Here in the airbag device M3, the airbag 98 and the inflator 109 are sealed up by arranging the two mounting brackets 119 at two positions, i.e., on the front end side and on the rear end side of the inflator 109. These sealing portions are individually formed by the forced contact along the circumferential direction of the outer circumference of the inflator 109. Specifically, those sealing portions retain the sealing pressures in the circumferential direction generally normal to the injection directions of the inflating gas G, from the first and second injection ports 114a and 115a of the diffuser 111. Therefore, the sufficient sealing properties can be retained, although the sealing pressures are not high. As a result, the sealing structure can be simplified to avoid difficulties in connecting the inflator 109 and the gas inlet port 100.

Here in the airbag device M3, the gas inlet port 100 of the airbag body 99 is constructed of the vertical cylinder portion 100a and the horizontal cylinder portion 100b and is given the T-shape by closing the side of the front end 100d of the horizontal cylinder portion 100b. However, the gas inlet port 100 should not be limited to that shape. For example, the gas inlet port to be used may be formed generally into a T-shape by opening the front end side of the horizontal cylinder portion. Moreover, the gas inlet port to be used may be formed generally into an L-shape by connecting the vicinity of the front end of the horizontal cylinder portion to the vicinity of the upper end of the vertical cylinder portion. On the other, the shape of the gas inlet port may be that of the gas inlet port 17 in the airbag body 12 of the first embodiment or that of the gas inlet port 78 in the airbag body 77 of the second embodiment. In the airbag device M3, on the other hand, the inlet side portion 103 of the current regulating cloth 102 is shaped to open the front end 103a and the rear end 103b. However, the inlet side portion 103 of the current regulating cloth 102 should not be limited to that shape. The inlet side portion may be shaped by opening only its rear end side, for example.

Figure 18:
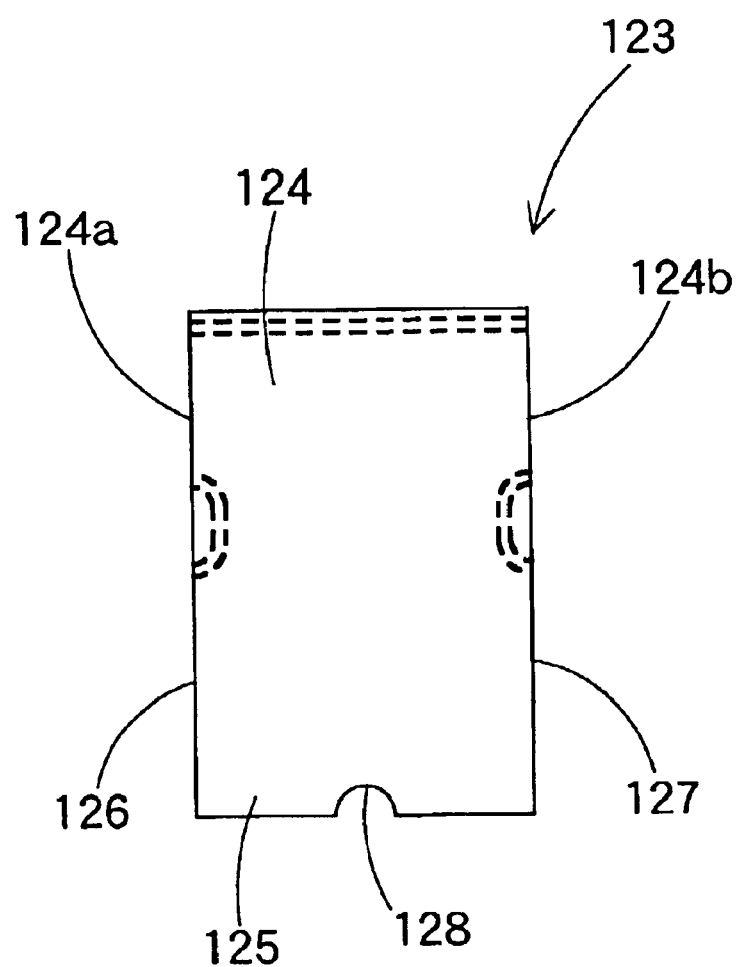
FIG. 18 is a front elevation showing a modified current regulating cloth to be used in the head protecting airbag device of the third embodiment.

Moreover, a current regulating cloth 123 to be inserted into the airbag body 99 may have the construction shown in FIG. 18.

Like the aforementioned current regulating cloth 35, the current regulating cloth 123 is formed of a flexible woven fabric of polyamide yarns or polyester yarns. This current regulating cloth 123 is provided with an inlet side portion 124 and an outlet side portion 125. The inlet side portion 124 is arranged in the gas inlet port 100 of the airbag body 99. The outlet side portion 125 is arranged in the vicinity of the gas inlet port 100 in the gas feed passage portion 16.

The inlet side portion 124 and the outlet side portion 125 are formed to have substantially equal longitudinal width sizes. These width sizes are set slightly smaller than the longitudinal width size near the connection portion of the gas inlet port 100 to the gas feed passage portion 16. This is so that the current regulating cloth 123 can be inserted into the airbag body 99. Moreover, the inlet side portion 124 is constructed to open a front end 124a and a rear end 124b in which the inflator 109 is inserted.

The outlet side portion 125 is provided with two front and rear end openings, individually for first and second gas outlet holes 126 and 127. And, these first and second gas outlet holes 126 and 127 have opening width sizes w13 and w14 smaller than the width size w2 of the gas feed passage portion 16 in the airbag body 99. Moreover, the opening width sizes w13 and w14 of the first and second gas outlet holes 126 and 127 are substantially equalized to each other. In other words, the first and second gas outlet holes 126 and 127 are set to have substantially equal opening areas at the time of inflation. In the lower edge side of the outlet side portion 125 between the first gas outlet hole 126 and the second gas outlet hole 127, there is formed a third gas outlet hole 128, which can inject the inflating gas G downward. The third gas outlet hole 128 is formed to have an opening width size w15 smaller than the opening width sizes w13 and w14 of the first and second gas outlet holes 126 and 127. In the current regulating cloth 123, too, the first and second gas outlet holes 126 and 127 are individually positioned near the upper side of the horizontal joint portions 31 when the current regulating cloth 123 is arranged in the airbag body 99. At this time, the third gas outlet hole 128 is also positioned above the vertical inflation portion 21A.

Figure 19:
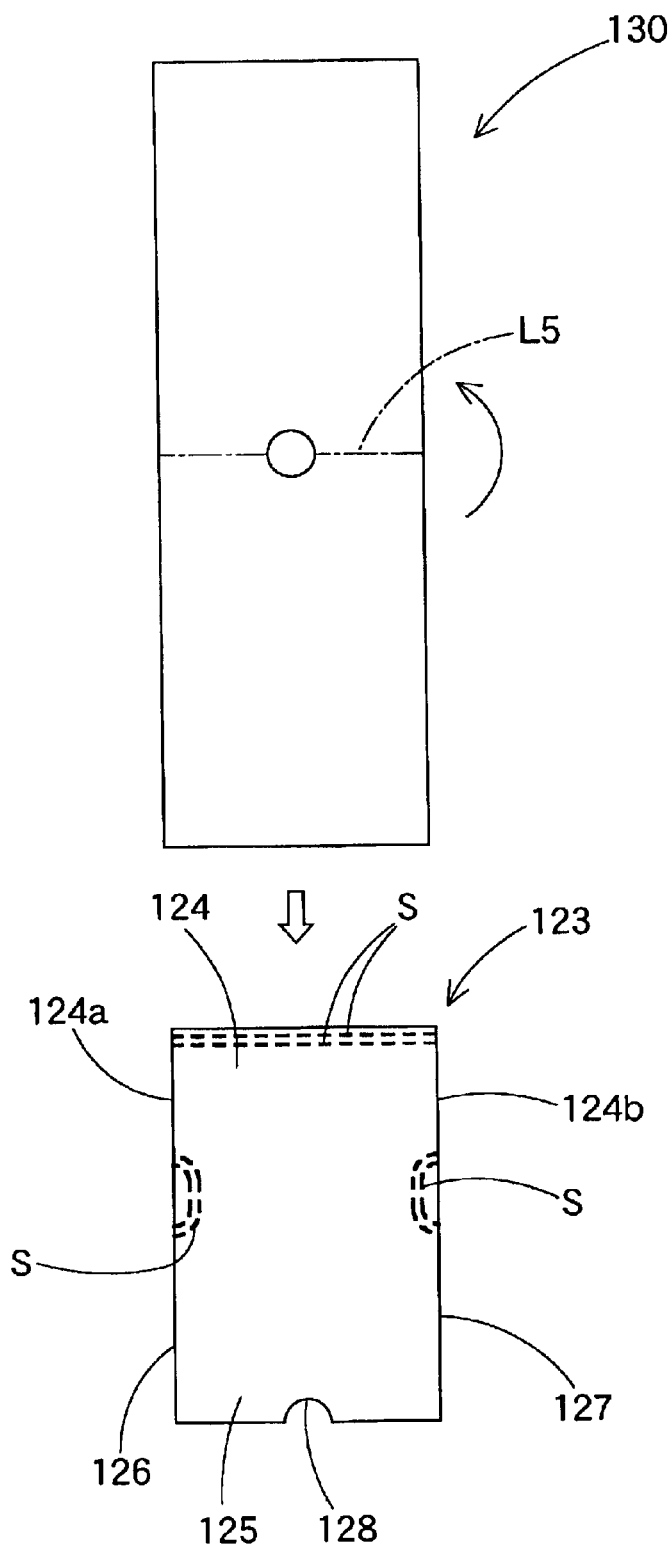
FIG. 19 is a diagram of a manufacturing step of the current regulating cloth of FIG. 18.

This current regulating cloth 123 is formed in the following manner. First of all, a generally rectangular current regulating cloth material 130, in which a generally circular opening is arranged at a central portion to form the third gas outlet hole, is folded back along a central fold L5, as shown in FIG. 19. After this, the peripheral edges excepting the portions for the front and rear ends 124a and 124b of the inlet side portion 124 and the portions for the first and second gas outlet holes 126 and 127 are sewn to each other with the sewing thread S. Thus, the current regulating cloth 123 can be formed.

Figure 20:
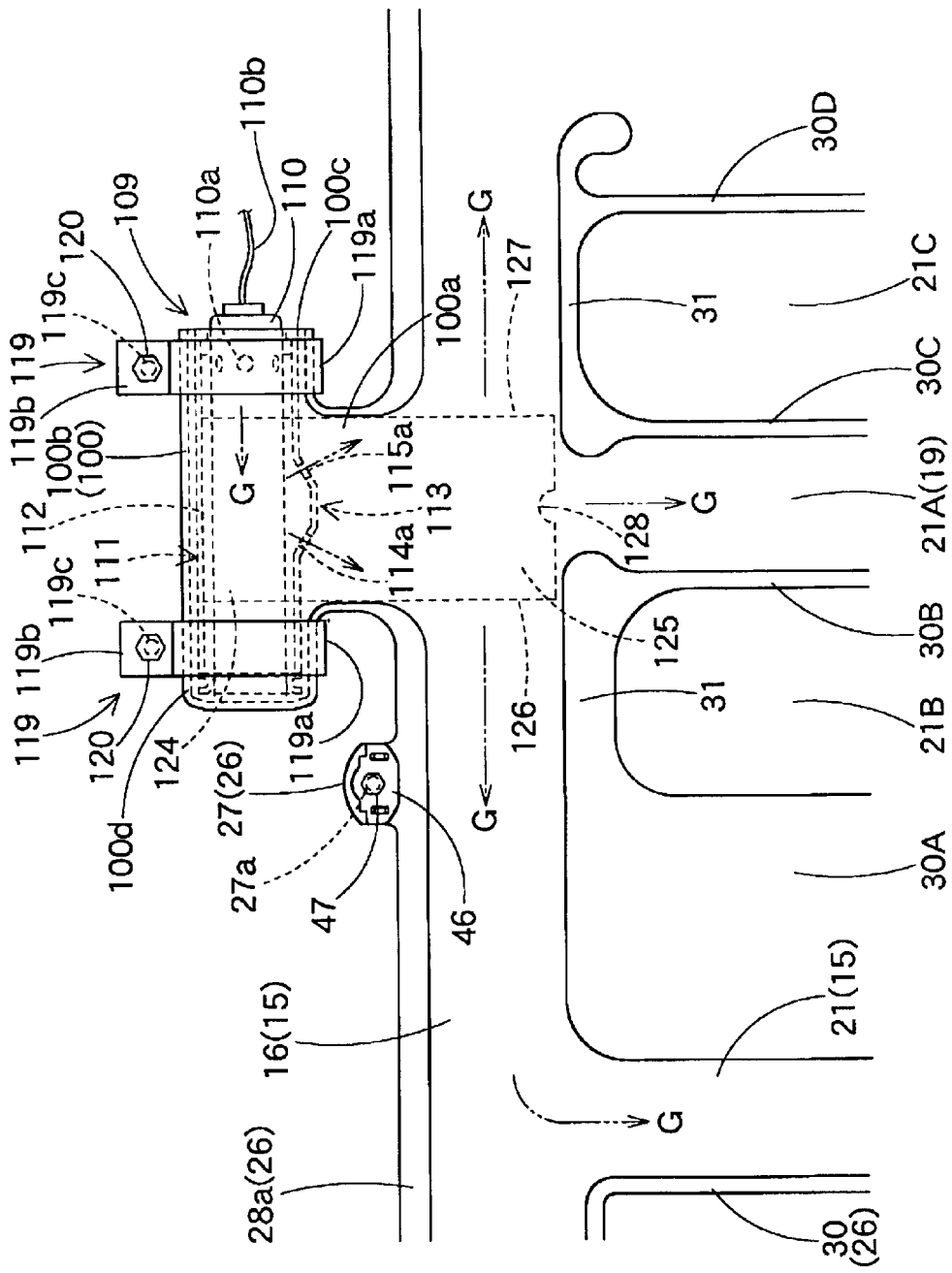
FIG. 20 is a schematic diagram showing the flow state of an inflating gas released from the current regulating cloth in the head protecting airbag device in which the current regulating cloth of FIG. 18 is arranged.

In this current regulating cloth 123, the inlet side portion 124 and the outlet side portion 125 are set to have substantially equal longitudinal width sizes. Therefore, the current regulating cloth 123 is not fixed by the mounting brackets 119, unlike the aforementioned current regulating cloth 102. Specifically, the current regulating cloth 123 is fixed merely by supporting the inlet side portion 124 on the diffuser 111 of the inflator 109, as shown in FIG. 20.

Here will be described an airbag device M4 according to a fourth embodiment of the invention. This airbag device M4 has a construction similar to that of the aforementioned airbag device M3 excepting a current regulating cloth 132 and a diffuser 141 of an inflator 140. Therefore, similar members will be omitted from description, designating them by the same reference numerals.

Figure 22:
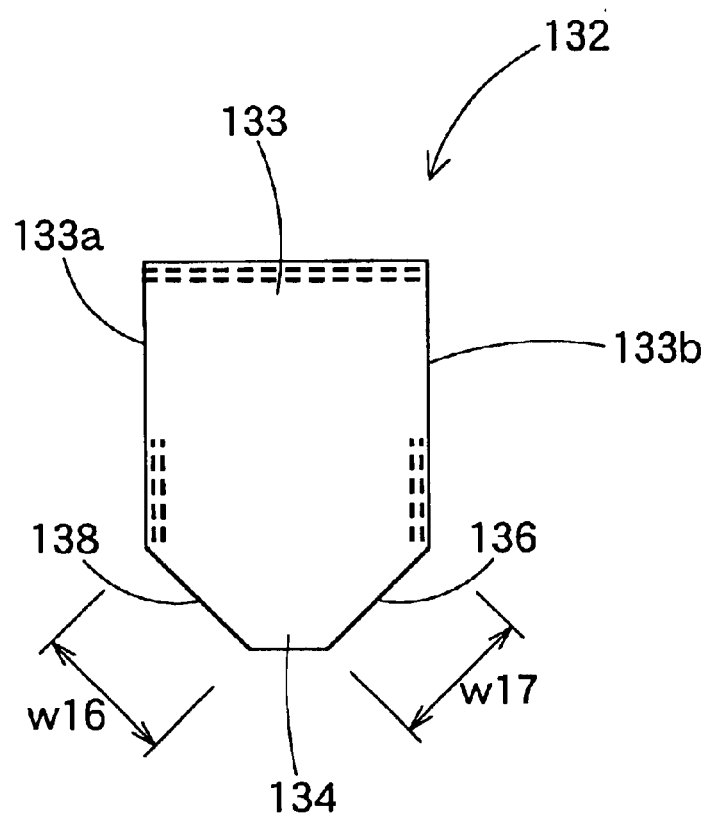
FIG. 22 is a front elevation of a current regulating cloth to be used in the fourth embodiment.

The current regulating cloth 132 is formed, like the aforementioned current regulating cloth 35, of a flexible woven fabric of polyamide yarns or polyester yarns. As shown in FIG. 22, the current regulating cloth 132 is provided with an inlet side portion 133 and an outlet side portion 134. The inlet side portion 133 is arranged in the gas inlet port 100 of the airbag body 99. The outlet side portion 134 is arranged in the vicinity of the gas inlet port 100 in the gas feed passage portion 16.

The inlet side portion 133 and the outlet side portion 134 are formed to have substantially equal width sizes in the longitudinal direction. These width sizes are set slightly smaller than the longitudinal width size near the connection portion of the gas inlet port 100 to the gas feed passage portion 16. This is so that the current regulating cloth 132 can be inserted into the airbag body 99. On the other hand, the inlet side portion 133 is constructed to have its front end 133a and rear end 133b opened so that the inflator 140 can be inserted.

The outlet side portion 134 is provided, on the front edge side and the rear edge side on its lower edge side, with first and second gas outlet holes 135 and 136, which are formed to have opening faces sloped to the front side or to the rear side from the vertical direction. These first and second gas outlet holes 135 and 136 can release the inflating gas G, as discharged from the inflator 140, downward and to the front side, downward and to the rear side, in the longitudinal direction of the airbag body 99. Moreover, the first and second gas outlet holes 135 and 136 are given substantially equal opening width sizes w16 and w17. In other words, the first gas outlet hole 135 and the second gas outlet hole 136 are set to have substantially equal opening areas at the time of inflation. In the embodiment, moreover, the first and second gas outlet holes 135 and 136 are individually arranged at positions capable of releasing the inflating gas G toward the horizontal joint portions 31 when the current regulating cloth 132 is arranged in the airbag body 99.

Figure 23:
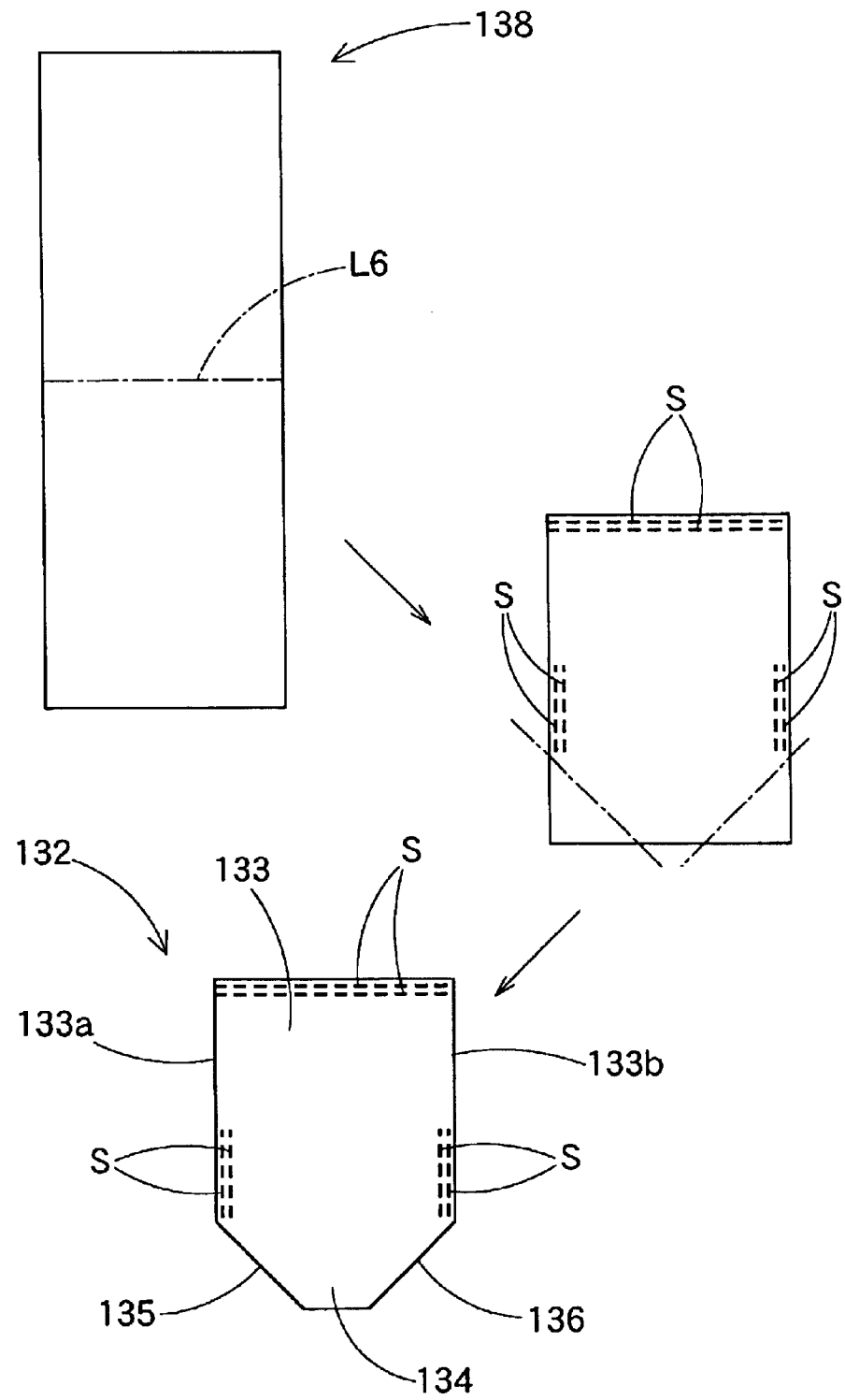
FIG. 23 is a diagram of a manufacturing step of the current regulating cloth of FIG. 22.

This current regulating cloth 132 is formed in the following manner. First of all, a generally rectangular current regulating cloth material 138 is folded back along a center fold L6, as shown in FIG. 23. Then, the upper edge side and the substantial middle portions in the two left and right edges are sewn with the sewing thread S. After this, the vicinities of the front end and the rear end on the lower end side are individually cut off obliquely to form the first and second gas outlet holes 135 and 136, so that the current regulating cloth 132 can be formed.

Figure 21:
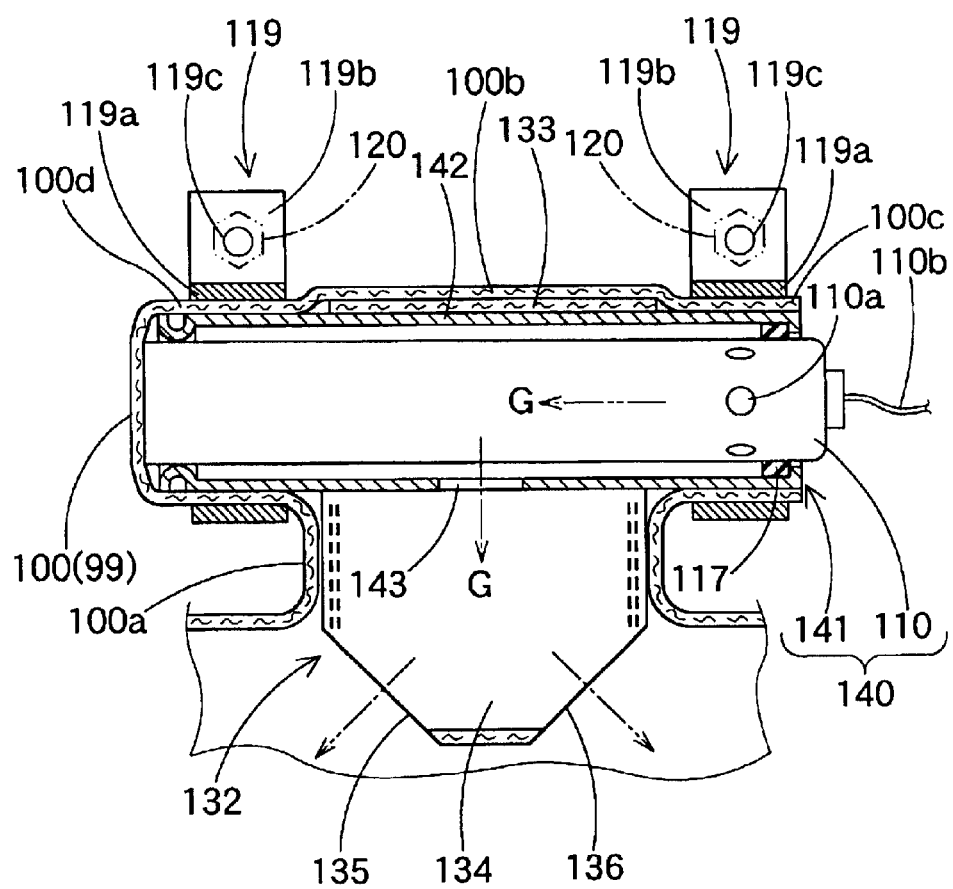
FIG. 21 is a partially enlarged section of the inflator arranging portion of a head protecting airbag device of a fourth embodiment.

In the airbag device M4, the body portion 110 to be used in the inflator 140 has a construction similar to that of the aforementioned airbag device M3. Therefore, similar members will be omitted from description, designating them by the same reference numerals. And, the diffuser 141 to be used in the inflator 140 of the airbag device M4 is formed into a generally cylinder shape so that it can be mounted on the body portion 110, as shown in FIG. 21. The diffuser 141 is made of a board metal and holds shape better than the current regulating cloth 132. Moreover, the diffuser 141 is provided with a cylinder portion 142, and the packing 117 for preventing the gas leakage from the end portion of the diffuser 141 when the diffuser 141 is assembled with the body portion 110. The cylinder portion 142 sheaths substantially the entire outer circumference of the body portion 110 all over its length. The packing 117 is arranged near the end face of the cylinder portion 142 on the side of the gas discharge ports 110a. At roughly the longitudinal middle of the cylinder portion 142, moreover, there is arranged one injection port 143, which can inject the inflating gas G discharged from the body portion 110, downward to the side of the outlet side portion 134 of the current regulating cloth 132. Throughout the circumference near the leading end (or the front end) of the cylinder portion 142, there is formed a recessed ridge portion 142a forcibly contacting with body portion 110. This recessed ridge portion 142a prevents the gas leakage from the diffuser 111.

Figure 24:
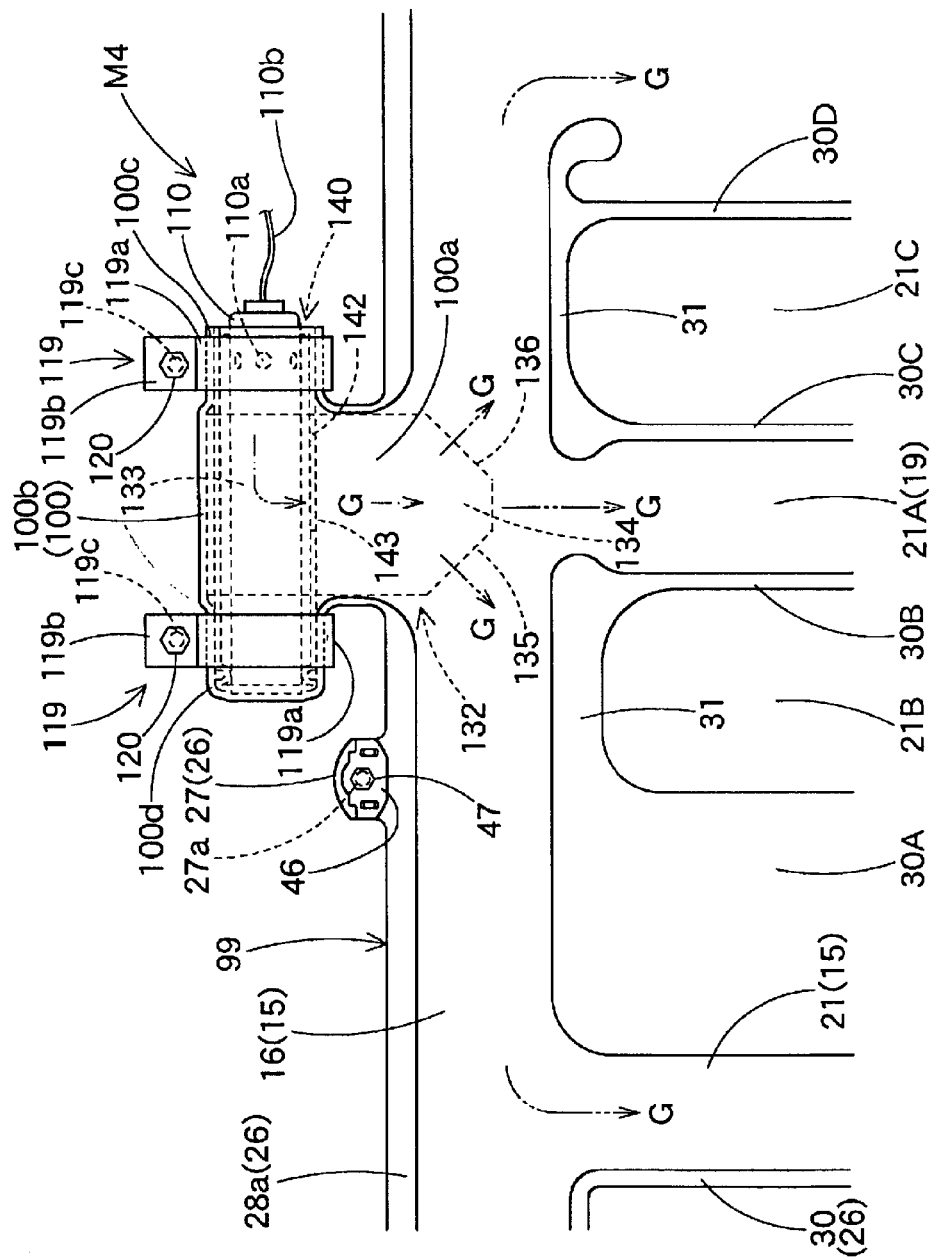
FIG. 24 is a schematic diagram showing the flow state of an inflating gas released from the current regulating cloth in the head protecting airbag device of the fourth embodiment.

The airbag device M4 thus constructed can be mounted on the vehicle like the aforementioned airbag device M3. In the airbag device M4, moreover, when the airbag body 99 is expanded and inflated, the inflating gas G discharged from the inflator 140 is released into the airbag body 99 from the first and second gas outlet holes 135 and 136 formed in the current regulating cloth 132, as shown in FIG. 24. In short, the airbag device M4 can achieve actions and effects similar to those of the aforementioned airbag device M3.

Here in the individual embodiments, the current regulating cloths 35, 61, 80, 93, 102, 123 and 132 are formed of a woven fabric of polyamide yarns or polyester yarns by sewing their predetermined positions with the sewing thread S. For example, the current regulating cloths may be formed by the hollow-weaving method like the airbag bodies 13, 77 and 99.

In the foregoing individual embodiments, moreover, in the current regulating cloths 35, 61, 80, 102, 123 and 132, the opening areas of the first gas outlet holes 39, 65, 83, 105a, 126 and 135 and the opening areas of the second gas outlet holes 40, 66, 84, 106a, 127 and 136 are set substantially equal at the time of inflation. These opening areas may be set to be different, in case the outflows of the inflating gas G to the front side portion or the rear side portion in the airbag bodies 13, 77 and 99 are to be made different, for example.

What is claimed is:

1. A head protecting airbag device comprising:

an airbag folded and housed above the upper edge of a window on the interior side of a vehicle and adapted to be inflated downward, when the airbag admits an inflating gas, to cover the interior side of said window, wherein said airbag includes an airbag body and a flexible current regulating cloth, wherein said airbag body includes: an inflation shielding portion for shielding the interior side of said window; a gas feed passage portion for guiding the inflating gas discharged from an inflator into said inflation shielding portion; and one gas inlet port constructed to be connected to said inflator, wherein said inflation shielding portion is inflated to separate an interior side wall portion and an exterior side wall portion of said airbag by admitting the inflating gas, wherein said gas feed passage portion is arranged above the upper edge of said inflation shielding portion and in the longitudinal direction of the vehicle, wherein said gas inlet port is arranged to communicate with a portion in said gas feed passage portion at a position removed from the front end and the rear end and protruded upward from said gas feed passage portion, wherein said current regulating cloth includes an inlet side portion arranged in said gas inlet port and connected with said inflator, and an outlet side portion arranged near said gas inlet port of said gas feed passage portion, and wherein said outlet side portion includes a first gas outlet hole and a second gas outlet hole capable of releasing the inflating gas discharged from said inflator to the front and the rear along said gas feed passage portion, the first gas outlet hole and the second gas outlet hole being arranged proximate to the gas inlet port.

2. A head protecting airbag device according to claim 1, wherein said outlet side portion is formed into a generally cylindrical shape having front and rear ends opened to respectively form said first and second gas outlet holes, and wherein said outlet side portion is made to have an external diameter size smaller than the internal diameter size of said gas feed passage portion in said airbag body.

3. A head protecting airbag device according to claim 1, wherein said outlet side portion further includes a third gas outlet hole formed in the lower side between said first gas outlet hole and said second gas outlet hole for injecting the inflating gas downward.

4. A head protecting airbag device according to claim 2, wherein joint portions are arranged near the lower edges of said first and second gas outlet holes of said current regulating cloth in said airbag body and lined up in the longitudinal direction to construct the lower edge side of said gas feed passage portion and are constructed by being joined to said interior side wall portion and to said exterior side wall portion.

5. A head protecting airbag device according to claim 1, wherein the opening faces of said first and second gas outlet holes in said outlet side portion are oblique to the vertical direction when the inflating gas flows out, and wherein the inflating gas spurting from said first and second gas outlet holes are released in two directions, downward and to the front, and downward and to the rear, in the longitudinal direction of said airbag body.

6. A head protecting airbag device according to claim 1, wherein said inflator includes a generally column-shaped body portion, and a generally cylindrical diffuser capable of being mounted on said body portion, wherein said body portion includes gas discharge ports capable of discharging the inflating gas, wherein said diffuser is provided in its circumference with an injection port for injecting the inflating gas discharged from said gas discharge ports, and holds shape better than said current regulating cloth, wherein said diffuser is so assembled with said body portion as to inject the inflating gas discharged from said gas discharge ports, from said injection port, wherein said inflator is inserted, when assembled with said airbag, into said inlet side portion in said current regulating cloth so as to support said current regulating cloth, and wherein said injection port is arranged to inject the inflating gas downward toward said outlet side portion.

7. A head protecting airbag device according to claim 6, wherein said diffuser is provided with two injection ports capable of injecting the inflating gas in two directions, downward and to the front side, and downward and to the rear side, in the longitudinal direction of said airbag body toward said outlet side portion.

8. A head protecting airbag device according to claim 1, wherein said gas feed passage portion is arranged substantially along the entire length, in the longitudinal direction, of said airbag body.

9. A head protecting airbag device according to claim 1, wherein said inlet side portion of said current regulating cloth further comprises a portion arranged to cover and be supported by an upper surface of said inflator.

10. A head protecting airbag device according to claim 1, wherein a longitudinal dimension of said outlet side portion of said current regulating cloth is equal to or greater than a longitudinal opening width of a lower side of said gas inlet port.

11. A head protecting airbag device according to claim 1, wherein a longitudinal dimension of said outlet side portion of said current regulating cloth is less than a longitudinal opening width of a lower side of said gas inlet port.

* * * * *